(12) United States Patent
Rovinsky

(10) Patent No.: US 9,995,559 B2
(45) Date of Patent: Jun. 12, 2018

(54) ANTI-ROCKET SYSTEM

(71) Applicant: ISRAEL AEROSPACE INDUSTRIES LTD., Lod (IL)

(72) Inventor: Jacob Rovinsky, Modiin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days. days.

(21) Appl. No.: 14/935,831

(22) Filed: Nov. 9, 2015

(65) Prior Publication Data

US 2016/0231089 A1 Aug. 11, 2016

Related U.S. Application Data

(63) Continuation of application No. 14/371,480, filed as application No. PCT/IL2013/050026 on Jan. 10, 2013, now Pat. No. 9,207,049.

(30) Foreign Application Priority Data

Jan. 10, 2012 (IL) .......................................... 217450

(51) Int. Cl.
*F41H 11/02* (2006.01)
*F41G 7/30* (2006.01)
(Continued)

(52) U.S. Cl.
CPC ............... *F41H 11/02* (2013.01); *F41G 7/30* (2013.01); *F41G 7/303* (2013.01); *F42B 15/01* (2013.01);
(Continued)

(58) Field of Classification Search
CPC ................................. F41H 11/02; F41H 11/04
(Continued)

(56) References Cited

U.S. PATENT DOCUMENTS 2,932,467 A 4/1960 Scorgie
4,093,153 A 6/1978 Bardash et al.
(Continued)

FOREIGN PATENT DOCUMENTS

DE 4123898 1/1993
FR 2709835 3/1995
(Continued)

OTHER PUBLICATIONS

Goad, "Surveying with the Global Positioning System," Global Positioning System: Theory and Applications, II : 501-517 (1997).
(Continued)

*Primary Examiner* — Joshua E Freeman
(74) *Attorney, Agent, or Firm* — Browdy and Neimark, PLLC

(57) ABSTRACT

A counter-flying object system comprising a sensor array including at least one active sensor configured to detect and track the flying object, and a missile launcher configured to launch an interceptor to intercept the flying object, wherein upon launching of the interceptor, the sensor array is configured to determine the location of the interceptor and send said object and interceptor locations to a control system, the control system being configured to provide mission data to the interceptor based on said object and interceptor locations for guiding the interceptor toward the flying object and activating a fragmentation warhead on or in the vicinity of said flying object when a lethality criteria is met.

6 Claims, 16 Drawing Sheets

(51) Int. Cl.
  *G01S 7/00* (2006.01)
  *G01S 13/00* (2006.01)
  *G01S 13/87* (2006.01)
  *F42B 15/01* (2006.01)

(52) U.S. Cl.
  CPC ............ *G01S 7/003* (2013.01); *G01S 13/003* (2013.01); *G01S 13/878* (2013.01)

(58) Field of Classification Search
  USPC ........................................................ 89/1.11
  See application file for complete search history.

(56) References Cited

U.S. PATENT DOCUMENTS

| | | | |
|---|---|---|---|
| 4,315,609 A | 2/1982 | Mclean et al. | |
| 4,442,431 A | 4/1984 | Bleakney | |
| 4,925,129 A | 5/1990 | Salkeld et al. | |
| 5,184,137 A | 2/1993 | Pozgay | |
| 5,274,545 A | 12/1993 | Allan et al. | |
| 5,379,966 A | 1/1995 | Simeone et al. | |
| 5,477,458 A | 12/1995 | Loomis | |
| 5,811,788 A | 9/1998 | Wicke | |
| 5,874,917 A | 2/1999 | Desodt | |
| 6,209,820 B1* | 4/2001 | Golan | F41G 7/2206 244/3.1 |
| 6,308,076 B1 | 10/2001 | Hoirup et al. | |
| 6,469,654 B1 | 10/2002 | Winner | |
| 6,653,972 B1 | 11/2003 | Krikorian et al. | |
| 7,142,154 B2 | 11/2006 | Quilter et al. | |
| 7,492,316 B1 | 2/2009 | Ameti et al. | |
| 7,977,614 B2 | 7/2011 | Raviv | |
| 8,253,628 B2 | 8/2012 | Duffett-Smith et al. | |
| 8,563,910 B2* | 10/2013 | Elwell, Jr. | F42B 12/22 102/473 |
| 8,674,277 B2* | 3/2014 | Axford | F42B 10/12 102/501 |
| 2002/0140596 A1* | 10/2002 | Stolarczyk | F41H 11/12 342/22 |
| 2005/0077424 A1 | 4/2005 | Schneider | |
| 2006/0103569 A1 | 5/2006 | Pappert et al. | |
| 2006/0238403 A1* | 10/2006 | Golan | F41G 5/08 342/62 |
| 2006/0284050 A1 | 12/2006 | Busse et al. | |
| 2008/0148930 A1 | 6/2008 | Frick | |
| 2010/0117888 A1 | 5/2010 | Simon | |
| 2011/0127328 A1* | 6/2011 | Warren | F41G 5/08 235/412 |
| 2011/0246069 A1 | 10/2011 | Peres et al. | |

FOREIGN PATENT DOCUMENTS

| | | |
|---|---|---|
| WO | 0161426 A2 | 8/2001 |
| WO | 2010125569 A1 | 11/2010 |

OTHER PUBLICATIONS

Parkinson, "GPS Error Analysis," Global Positioning System: Theory and Applications, II: 469-483 (1997).

Roberts et al "TDOA Localization Techniques" Localization Techniques IEEE 802.15-04a/572r0 ieee802.org/. . . /15/04/0572-00-004a-tdoa-localization-techniques.ppt, (Oct. 2004).

Langley, Richard. "Dilution of Precision" GPS World, Innovation. http://gauss.gge.unb.ca/papes.pdf/gpsworld.may99.pdf (May 1999).

Foss, Christopher F. (ed), "Aerospace Industries Organization Fadjr-5 333 mm (4-round) Artillery Rocket System", Jane's Armour and Artillery, 23rd ed., pp. 1-7 (2002).

Jane's Information Group, "Iranian 333 mm Fadjr-5 Rocket", Jane's Ammunition Handbook, , p. 1 (2004).

Jane's Information Group, "Russian Federation 122 mm BM-21 Grad Series Rockets", Jane's Ammunition Handbook, pp. 1-9 (2004).

Skolnik, Merrill 1., "Tracking Radar", Introduction to Radar Systems, pp. 210-212 (2000).

Barton, David K. (ed.), Radar Technology Encyclopedia, pp. 42-43 (1997).

Hooton, E. R. (ed), "RIM-116 RAM (Mk 31 Guided Missile Weapon System)/Sea RAM/Rapids," Jane's Naval Weapon Systems, pp. 395-397 (2003).

Hooton, E. R. (ed), "RIM-116A RAM/Sea RAM," Jane's Naval Weapon Systems, pp. 369-371 (2001).

Hooton, E.R. (ed), "RIM-116A RAM (Mark 31 Guided Missile Weapon System)/Sea RAM," pp. 373-375 (2002).

* cited by examiner

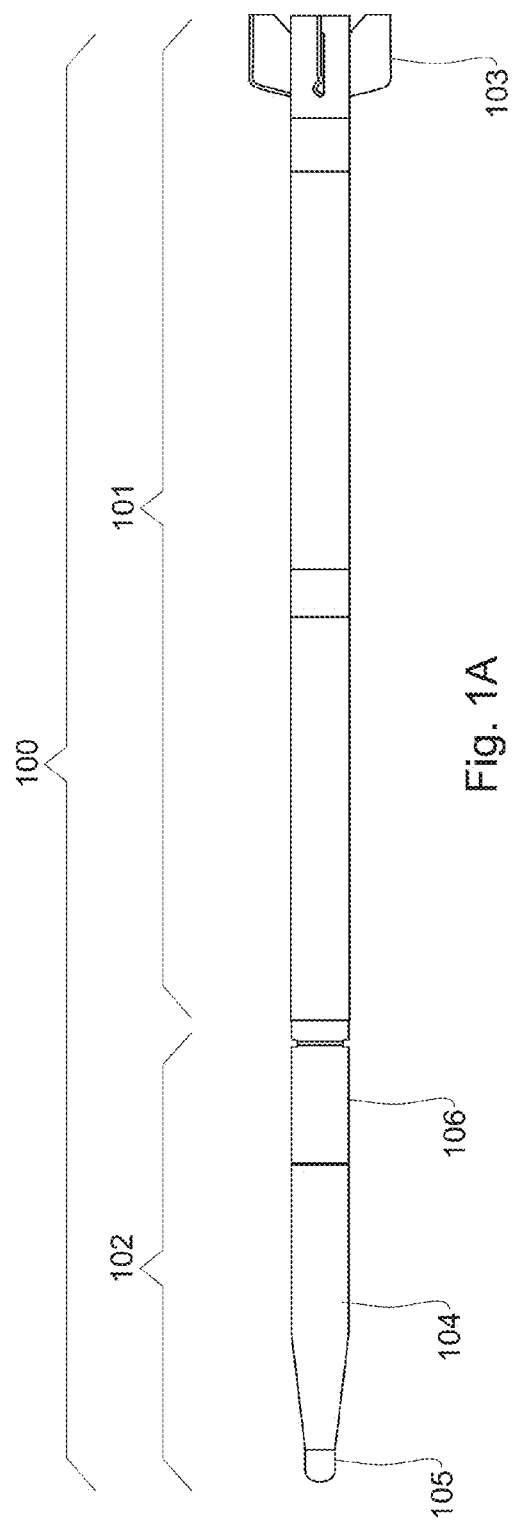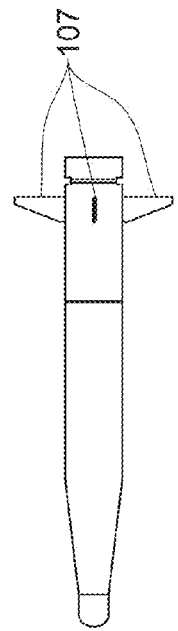
Fig. 1A
Fig. 1B

ANTI-ROCKET SYSTEM

FIELD OF THE INVENTION

This invention relates to the field of anti-missile missiles (AMMs).

BACKGROUND OF THE INVENTION

Ground to Ground (GTG) rockets such as the GRAD are a serious threat when hitting a territory populated by civilians. Such rockets are of relatively simple structure as they do not employ a guidance system and are devoid of an on-board controllable steering mechanism. The hitting point at the target territory is generally dependent on the distance from the launcher, the launcher's angular positioning (azimuth and inclination) and rocket's kinematics and ballistic characteristics. A variety of certain unpredictable factors may influence the accuracy of the hitting point: winds profile during the rocket flight, asymmetry of nozzle erosion during the boost phase, and missile asymmetry (geometry and center of gravity position) due to manufacturing deviations. Shortening of the boost phase and spinning of the rocket are common use techniques for improvement of rocket accuracy. Accordingly, the hitting point can be planned in advance and once the rocket is launched, its flight cannot be altered by utilization of a controllable steering mechanism.

However, the simple GTG rocket structure has a clear inherent advantage of a very simple launching means and a low-cost price tag, facilitating deployment of numerous launchers and utilization of numerous rockets which can be launched in large numbers over a long period of time towards friendly territory, which may cause not only damage to property and humans, but also substantial damage to the morale of the population which is subjected to prolonged and continuous threats.

The combined effect of kinetic energy accumulated by the impinging rocket and the detonated explosive of war-head fragments are sufficient in many cases to penetrate walls and cause significant damage to buildings. Whilst thick concrete and other structures may block penetration of the rocket, it is practically infeasible to shield buildings with armored concrete, when considering for example several cities that are in the range of a GRAD threat.

Recently a new anti-rocket system called the "IRON DOME" system (commercially available from RAFAEL, Israel) has been introduced and used by the Israel Defense Forces (IDF) for protecting various towns that are targeted by GRAD and other rockets launched from The Gaza Strip.

Basically a typical anti rocket system is based on an early warning system, unique radar that detects and tracks a flying rocket, a Battlement Control System (BMC) that estimates its flight trajectory and potential hitting area, and launches a counter missile (using inter alia on-board navigation, homing and steering systems) for intercepting the oncoming rocket. The BMC updates the interceptor trajectory using the uplink communication channel. The system must operate under very tight operational constraints including, but not limited to, determining a Predicted Interception Point (PIP) at very high accuracy and operating in an extremely short time frame, as the whole flight trajectory from launch to interception may extend, in certain operational scenarios, to only a few tens of seconds. Another significant challenge of the GTG rockets' interception relates to the lethality problem: the vulnerable area of the rocket has relatively small dimensions and is surrounded by one or two layers of steel-made balls fitted into the warhead explosive. Achievement of lethal interception is possible by using the hit-to-kill technique or by hitting of the threat's warhead by the very dense beam of relatively heavy fragments (e.g. known per se tungsten fragments of at least 35-40 grams).

So to summarize, the main challenges of GTG rocket interception are related to a very tight time budget and to a very small vulnerable area of the target's warhead.

The net effect of the specified characteristics imposes utilization of a sophisticated and costly defense system compared to a very simple and low-cost rocket launch system. Assuming, for sake of discussion, numerous launched salvos of rockets over a prolonged period of time and aimed at many different targets, this may require deployment of many IRON DOME batteries. The latter are not only susceptible to hits but also involve significant costs per each intercept, compared to the negligible costs of each launched rocket.

There is thus a need for a new counter rocket (or possibly other flying object) system.

SUMMARY OF THE INVENTION

In accordance with an aspect of the presently disclosed subject matter, there is provided a counter-flying object system, comprising:

a sensor array that includes at least one active sensor configured to detect and track the flying object upon its launch and at least two passive sensors; the sensor array is configured to determine the object's location and upon launching of a seeker-less interceptor missile also the seeker-less interceptor missile's location and send them to a control system, the sensor array is further configured to achieve respective clock synchronization accuracy of at least 1 nanosecond between each two sensors of the array;

the control system is configured to generate a mission data including Predicted Interception Point (PIP), a time of launch, interceptor missile separation time and transfer it to the interceptor missile launcher, the control system is further configured to calculate, selectively update and send to the interceptor missile, through an uplink communication channel, uplink messages including updated Predicted Interception Point, updated interceptor missile separation time and the location of the interceptor missile during flight;

the launcher is configured to launch the seeker-less interceptor missile at the time of launch towards said Predicted Interception Point (PIP);

the seeker-less interceptor missile includes a separable motor, a warhead, a steering system, a communication system, and a navigation system configured to repeatedly generate navigation data;

the interceptor missile is configured to selectively utilize the mission data, the uplink messages and the navigation data for separation of the separable motor and generating steering commands to the steering system for guiding the interceptor missile toward the updated PIP and activating a fragmentation warhead on or in the vicinity of the PIP when a lethality criteria is met.

In accordance with an embodiment of the presently disclosed subject matter, there is further provided a system, where the ground control system further comprises an estimator for estimating the hitting point of the threatening flying object and in case that the hitting point is of no interest, the ground control system is configured to refrain from commanding the launcher to launch the interceptor missile.

In accordance with an embodiment of the presently disclosed subject matter, there is yet further provided a system, wherein the flying object is a ground to ground rocket.

In accordance with an embodiment of the presently disclosed subject matter, there is yet further provided a system, wherein the rocket is selected from the small diameter rockets that includes a 122 mm diameter GRAD rocket.

In accordance with an embodiment of the presently disclosed subject matter, there is yet further provided a system wherein the flying object is an aircraft.

In accordance with an embodiment of the presently disclosed subject matter, there is yet further provided a system, wherein the flying object is a cruise missile.

In accordance with an embodiment of the presently disclosed subject matter, there is yet further provided a system, wherein the separable motor of the interceptor is a motor of a ground to ground (GTG) rocket.

In accordance with an embodiment of the presently disclosed subject matter, there is yet further provided a system, wherein the steering commands comply guidance law with proportional navigation rules.

In accordance with an embodiment of the presently disclosed subject matter, there is yet further provided a system, comprising at least one launcher battery each including at least two interceptor missiles for intercepting at least two simultaneously flying objects.

In accordance with an embodiment of the presently disclosed subject matter, there is yet further provided a system, wherein the active sensor is a radar.

In accordance with an embodiment of the presently disclosed subject matter, there is yet further provided a system, wherein the active sensor is a ladar.

In accordance with an embodiment of the presently disclosed subject matter, there is yet further provided a system wherein the navigation system includes an airborne computer and body angles measurement unit.

In accordance with an embodiment of the presently disclosed subject matter, there is yet further provided a system, wherein the body angles measurement unit includes three angle rate measurement units for determining navigation data including the interceptor missile body angular position in three mutually perpendicular axes.

In accordance with an embodiment of the presently disclosed subject matter, there is yet further provided a system, wherein the body angles measurement unit is a part of an inertial measurement unit that includes additional three accelerometers for continuously determining interceptor missile location and the interceptor missile body angular position in three mutually perpendicular axes.

In accordance with an embodiment of the presently disclosed subject matter, there is yet further provided a system, wherein the warhead includes a proximity fuse.

In accordance with an embodiment of the presently disclosed subject matter, there is yet further provided a system, wherein the warhead activation is initialized by the ground control system using command for fusing transferred to the interceptor missile by the uplink communication channel.

In accordance with an embodiment of the presently disclosed subject matter, there is yet further provided a system, wherein the interceptor missile includes an uplink receiver configured to receive a reflection of uplink beam energy from the flying object and to activate the warhead.

In accordance with an embodiment of the presently disclosed subject matter, there is yet further provided a system, wherein at least one passive sensor is fitted on a mobile platform.

In accordance with an embodiment of the presently disclosed subject matter, there is yet further provided a system, wherein the mobile platform is the interceptor missile.

In accordance with an embodiment of the presently disclosed subject matter, there is yet further provided a system, wherein at least one of the passive sensors is a stationary ground sensor.

In accordance with an embodiment of the presently disclosed subject matter, there is yet further provided a system, wherein the sensor array is configured to track the launched interceptor missile for determining its updated location by processing an echo originated from the active sensor energy reflected back from the interceptor and received by the sensors.

In accordance with an embodiment of the presently disclosed subject matter, there is yet further provided a system, wherein the array sensor is configured to track the launched interceptor missile for determining its updated location by processing a signal originated from a transmitter fitted on the interceptor and received by the sensors.

In accordance with an embodiment of the presently disclosed subject matter, there is yet further provided a system, wherein the interceptor missile is configured to generate the steering commands only after separation of the separable motor.

In accordance with an embodiment of the presently disclosed subject matter, there is yet further provided a system wherein the sensor array is configured to achieve respective clock synchronization accuracy of at least 1 nanosecond between each two sensors of the array, including performing computations based on the following equations: (Equations 1 and 2):

$$P_{AB}^S = P_B^S - P_A^S = \rho_{AB}^S + \delta t_{AB} \cdot c + B_{AB} + I_{AB}^S + T_{AB}^S + \varepsilon^{Code}$$

$$\Phi_{AB}^S = \Phi_B^S - \Phi_A^S = \rho_{AB}^S + \delta t_{AB} \cdot c + B_{AB} - I_{AB}^S + T_{AB}^S + F_{AB}^S + \varepsilon^{Phase}$$

Where samples A provided by a first sensor include:
$P_A^S$—Pseudo-range measurement of a satellite S at sensor A, and
$\Phi_A^S$—Carrier-phase measurement of said satellite S at sensor A. Samples B provided by second sensor include:
$P_B^S$—Pseudo-range measurement of said satellite S at sensor B, and
$\Phi_B^S$—Carrier-phase measurement of said satellite S at sensor B. and wherein:
$\rho_{AB}^S$—Difference in Ranges between sensors A and B and satellite S,
c—Speed of light,
$B_{AB}$—Difference between hardware delays between sensors A and B,
$I_{AB}^S$—Difference in ionospheric delays between sensors A and B and satellite S,
$T_{AB}^S$—Difference in tropospheric delays between sensors A and B and satellite S,
$F_{AB}^S$—Difference in floating ambiguities between said sensors A and B and said satellite S,
$\varepsilon^{Code}$—Pseudo-range sampling noise,
$\varepsilon^{Phase}$—Carrier Phase sampling noise,
$\delta t_{AB}$—Time difference between said sensors A and B;

$$\tilde{P}_{AB}^S = \delta t_{AB} \cdot c + \varepsilon^{Code}$$

$$\tilde{\Phi}_{AB}^S = \delta t_{AB} \cdot c + F_{AB}^S + \varepsilon^{Phase}$$

In accordance with an embodiment of the presently disclosed subject matter, there is yet further provided a system, wherein the active sensor is configured to detect and track more than one oncoming threat and more than one interceptor.

In accordance with an embodiment of the presently disclosed subject matter, there is yet further provided a system, wherein the control unit is configured to manage more than one interception process and can prioritize threats.

In accordance with an embodiment of the presently disclosed subject matter, there is yet further provided a system, wherein the prioritization is according to the estimated hitting point of the threat.

In accordance with an embodiment of the presently disclosed subject matter, there is yet further provided a system wherein the launcher is a rocket launcher.

In accordance with an embodiment of the presently disclosed subject matter, there is yet further provided a method of using the system, wherein the sensor array is deployed as follows: the first passive sensor is deployed substantially at the direction of the threat at coordinates (0,Yant1,0), and the second sensor is deployed at substantially perpendicular direction at coordinates (Xant2, Yant2,0) and wherein the active sensor is devoid of viewing backwardly and is deployed close to underneath the planned interception point, where $R_t/X_{ant2}<1.5$, and $R_t/Y_{ant1}<1.5$, and $Y_{ant2}/X_{ant2}<0.5$.

In accordance with an embodiment of the presently disclosed subject matter, there is yet further provided a method of using the system, wherein the sensor array is deployed as follows: the first passive sensor is deployed substantially at the direction of the threat at coordinates (0,Yant1,0), and the second sensor is deployed at substantially perpendicular direction at coordinates (Xant2, Yant2,0) and wherein the active sensor is capable of viewing backwardly and is deployed farther than the planned interception point, where $R_t/X_{ant2}<1.5$, and $R_t/Y_{ant1}<1.5$, and $Y_{ant2}/X_{ant2}<0.5$ In accordance with an embodiment of the presently disclosed subject matter, there is yet further provided a system, wherein the navigation system is configured to repeatedly generate the navigation data without handling "hand over" errors.

In accordance with an embodiment of the presently disclosed subject matter, there is yet further provided a system, wherein the PIP data is generated by the control system based on the active sensor and the updated PIP is more accurate and generated by the control system based also on the passive sensors.

In accordance with an aspect of the presently disclosed subject matter, there is yet further provided a seeker-less interceptor missile comprising a motor, an uplink communication system, a navigation system configured to repeatedly determine navigation data, a steering system and a warhead;

the interceptor is configured to receive through the uplink receiver unit mission data including:

Predicted Interception Point as determined by at least three accurately time synchronized external sensors;—
time of launch,
interceptor missile separation time, and
interceptor location data
and is further configured to repeatedly receive updated portions of the data including updated PIP, updated missile separation time and updated interceptor location data;

the navigation system is configured to generate, based on at least portion of the mission data updated data mission portion data and the navigation data, steering commands for the steering system for guiding the interceptor missile towards an updated PIP; and in response to meeting a lethality criteria, activating the warhead for damaging the flying object on or in the vicinity of the PIP.

In accordance with an embodiment of the presently disclosed subject matter, there is yet further provided a system, wherein the accuracy is in the order of 1 nanosecond.

In accordance with an embodiment of the presently disclosed subject matter, there is yet further provided a system, wherein the PIP is initially determined based on an external active sensor of the sensors and at least some of the repeatedly determined updated PIP are determined based on the at least three accurately time synchronized external sensors.

In accordance with an embodiment of the presently disclosed subject matter, there is yet further provided a seeker-less interceptor missile, wherein the navigation system includes a body angles measurement unit including three angle rate measurement units for repeatedly determining navigation data including the interceptor missile body angular position in three mutually perpendicular axes.

In accordance with an a aspect of the presently disclosed subject matter, there is yet further provided a method for intercepting an oncoming threat, comprising:

providing a sensor array that includes an active sensor and at least two passive sensors;

achieving respective clock synchronization accuracy of at least 1 nanosecond between each two sensors of the array;

detecting and tracking a flying object and determining its location;

generating mission data including:
Predicted Interception Point as determined by the accurately time synchronized sensors;
time of launch,
interceptor missile separation time, and interceptor location data launching an interceptor at the proper time towards the Predicted Interception Point;

repeatedly updating and transmitting portions of the mission data;

utilizing the mission data, updated data and navigation data for generating steering commands for guiding the interceptor towards the updated PIP; and activating a warhead in the vicinity of the PIP when a lethality criteria is met, for destroying the flying object.

In accordance with an aspect of the presently disclosed subject matter, there is yet further provided an early warning system for warning against oncoming flying objects, comprising:

a sensor array that includes at least one active sensor configured to detect and track the flying object upon its launch and at least two passive sensors; the sensor array is configured to determine the object's location;

a control system configured to achieve respective clock synchronization accuracy of at least 1 nanosecond between each two sensors of the array.

In accordance with an embodiment of the presently disclosed subject matter, there is yet further provided a system, further comprising an estimator for estimating the hitting point of the threatening flying object and in case it is designated to a protected area, providing an alert indication.

In accordance with an embodiment of the presently disclosed subject matter, there is yet further provided a method of using the system, wherein the sensor array is deployed as following: the first passive antenna is deployed substantially in the direction of the threat at coordinates (0,Yant1,0), and the second antenna is deployed at substantially perpendicular direction at coordinates (Xant2, Yant2,0) and wherein the active sensor is devoid of viewing backwardly and is deployed close to underneath the planned interception point, where $R_t/X_{ant2}<1.5$, and $R_t/Y_{ant1}<1.5$, and $Y_{ant2}/X_{ant2}<0.5$.

In accordance with an embodiment of the presently disclosed subject matter, there is yet further provided a method of using the system, wherein the sensor array is deployed as following: the first passive antenna is deployed substantially in the direction of the threat at coordinates (0,Yant1,0), and the second antenna is deployed at substantially perpendicular direction at coordinates (Xant2, Yant2,0) and wherein the active sensor is capable of viewing backwardly and is deployed farther than the planned interception point, where $R_t/X_{ant2}<1.5$, and $R_t/Y_{ant1}<1.5$, and $Y_{ant2}/X_{ant2}<0.5$ In accordance with an aspect of the presently disclosed subject matter, there is yet further provided a counter-flying object system, comprising:

a sensor array including at least one active sensor and at least two passive sensors, configured to detect and track the flying object location and, a missile launcher configured to launch a seeker-less interceptor to intercept the flying object, wherein upon launching of the seeker-less interceptor, the sensor array is configured to track the location of the interceptor and send the object and interceptor locations to a control system;

the control system being configured to provide updated mission data to the interceptor based on the object and interceptor locations for guiding the interceptor toward the flying object and activating a fragmentation warhead on or in the vicinity of the flying object when a lethality criteria is met.

In accordance with an embodiment of the presently disclosed subject matter, there is yet further provided a counter-flying system, wherein the control system is configured to provide mission data to the interceptor for guiding the interceptor during the whole flight trajectory of the interceptor toward the target.

In accordance with an embodiment of the presently disclosed subject matter, there is yet further provided a counter-flying system, wherein the sensor array is further configured to achieve a clock synchronization between each two sensors of the array enabling to achieve a miss distance between the object and the interceptor smaller than the lethality criteria.

In accordance with an embodiment of the presently disclosed subject matter, there is yet further provided a counter-flying system, wherein the clock synchronization accuracy between each two sensors of the sensor array is of at least 1 nanosecond.

BRIEF DESCRIPTION OF THE DRAWINGS

In order to understand and to see how it may be carried out in practice, a preferred embodiment will now be described, by way of non-limiting example only, with reference to the accompanying drawings, in which:

FIGS. 1A-B show schematic illustrations of an intercept missile, in accordance with certain embodiments of the invention;

DETAILED DESCRIPTION OF THE INVENTION

Figure 2A:
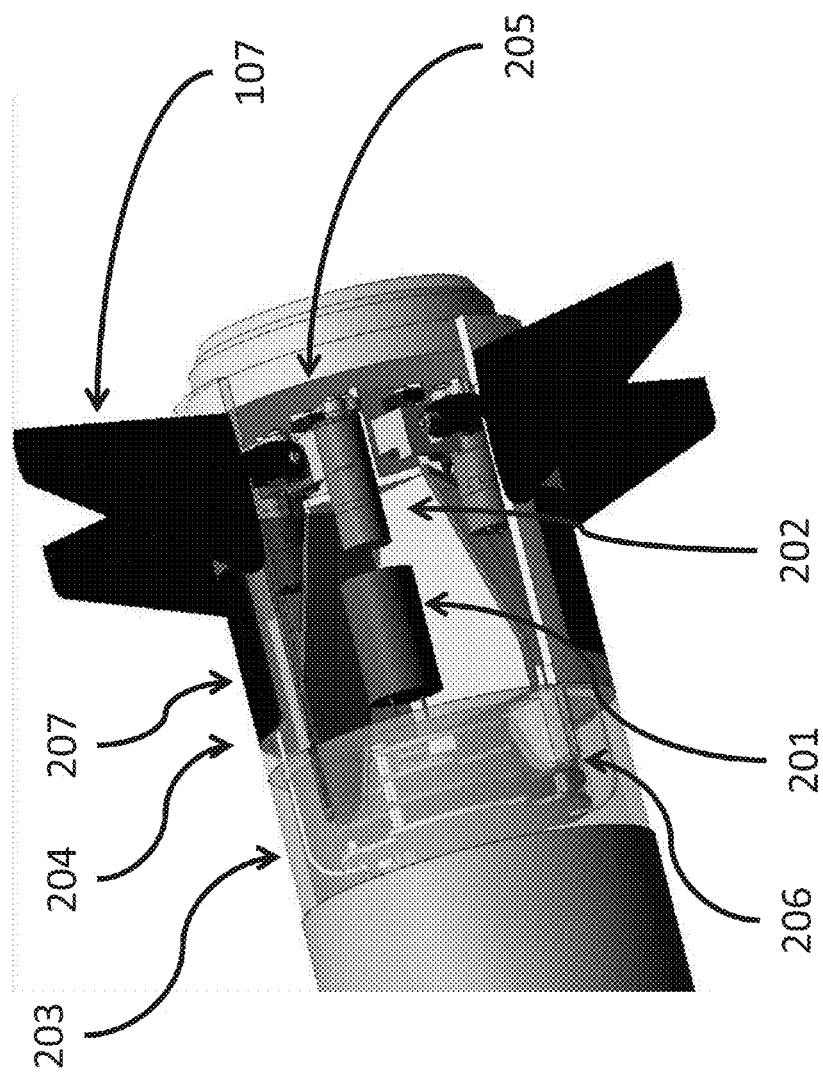
FIGS. 2A-B illustrate schematically configurations of an avionic section of the interceptor, in accordance with certain embodiments of the invention.

Attention is first drawn to FIG. 1A, showing a schematic illustration of an intercept missile, in accordance with certain embodiments of the invention. Thus, an interception missile 100 includes a solid motor 101 called also engine section, and a main section 102 which is seeker-less. The engine section further includes (e.g. wrap around) fins 103 which constitute an integral part of the solid motor and serve for stabilizing the missile during the boost and coast phases of the flight until separation occurs. The main section 102 consists of warhead 104 including its associated proximity fuse 105 and electronic section 106.

Note that in accordance with certain embodiments, the engine section is in fact an engine of a rocket (e.g. GRAD, MLRS etc.). The engine serves two main purposes: for boosting the interceptor until sufficient energy is accumulated and for increasing of the interceptor's ballistic coefficient during the coasting phase, whereupon a separation stage occurs and the engine is discarded. In certain embodiments, when a simple engine such as a rocket solid motor is used, the interception missile is not guided during the flight (until the engine section is discarded) and the steering fins will only serve for stabilizing the missile during the boost and coasting phases of flight.

Note also that the timing of the separation stage depends on the required divert maneuver for a specific interception scenario.

While the manner of operation of an interceptor missile that utilizes a simple rocket engine will be explained in greater detail below, it is already evident that in those embodiments that utilize a simple motor (e.g. a rocket motor being devoid of a controllable steering mechanism) and further the utilization of seeker-less main section, the price tag of the interceptor missile drastically drops, compared, for instance, to an interceptor missile that employs a controllable steering mechanism (that is utilized during the boost phase when the missile accelerates) and which further utilizes an airborne seeker sensor.

Note that in accordance with certain embodiments, a low cost rocket launcher may be utilized for the launching of the interceptor missile due to the similarity of an airframe and weight characteristics of the interceptor missile to the original rocket.

These characteristics cope with inherent limitation of significant costs per each launch which characterize e.g. the known per se IRON DOME interceptor missile.

Turning now to FIG. 1B, it illustrates the main section 102 after separation (namely after the engine has been separated). Note that after separation, steering fins 107 extend/are deployed from the main section body and will serve for stopping the spinning of the main section and diverting the interceptor toward Predicted Interception Point (PIP) all as will be explained in greater detail below. In accordance with certain embodiments, the low cost fins deployment mechanism may be designed for example by releasing of the mechanical energy of preloaded springs that will be unlocked during the separation.

FIG. 2A illustrates the electronic section comprising: a battery 201, a steering system 202, a navigation system 203 and a communication system 204 which will be further discussed with reference to FIG. 2C below. The steering system 202 includes drivers (not shown), actuators 205 and steering fins 107. The navigation system 203 includes airborne computer 206 and an inertial unit (not shown) capable of measurement of angle rates needed for determining an angular position of the missile in three mutually perpendicular axes. The communication system 204 includes uplink receiver (not shown) and antenna 207 needed for updating of the missile during the flight. Note that in accordance with certain embodiments, the precise measurements of the interceptor missile location during the flight produced (as will be explained in greater detail below) by a ground sensors array are provided to the interceptor missile via the uplink communication channel.

Note also that the inertial measurement unit may include three orthogonal accelerometers for increasing of accuracy of determining the interceptor missile location (and angular position of the missile in three mutually perpendicular axes between sequential uplink messages.

Note also that the airborne computer is capable at least of performing four main tasks: guidance task for diverting the interceptor missile toward the PIP, navigation task for determining the angular and linear position of the interceptor missile during flight, control task for close loop control of the steering mechanism and the special activities task for activation of the separation between the main section and the engine section of the interceptor missile and for the activation of the warhead section including proximity fuze.

Figure 2B:
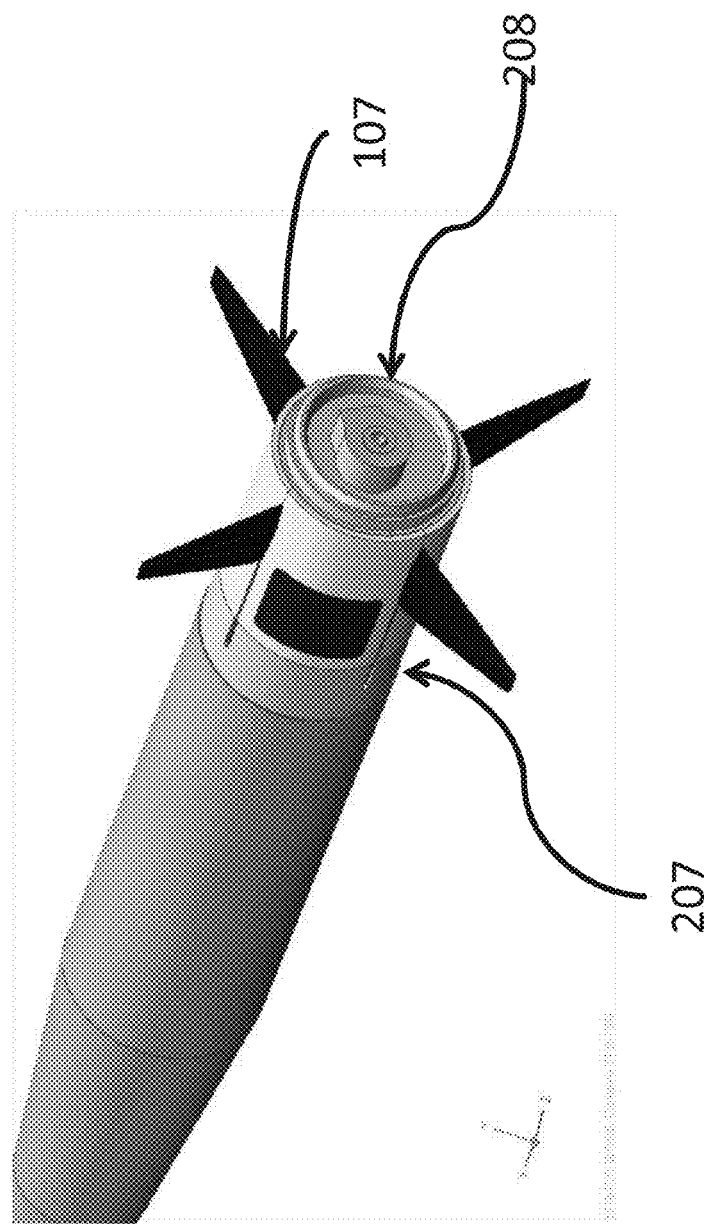

Turning now to FIG. 2B, it illustrates also uplink antenna 207 and the fins 107 as well as a known per se separation mechanism 208 facilitating the separation of the main section 102 (see FIG. 1A) from the motor 101 (see FIG. 1A).

Note that the invention is not bound by the specified interceptor missile configuration. Thus, for example, in certain embodiments the engine is not necessarily a rocket solid motor and in certain embodiments it may include a steering system. The steering system does not necessarily employ stabilization fins and accordingly other known per se steering elements may be used. By way of other examples the various operations of the airborne computer may be divided among various modules and/or allocated to one or more of the ground sensors and/or control units. The warhead section may not include the proximity fuse and be activated directly by an airborne computer. The main section may include an additional kick motor for sustaining the interceptor velocity during the divert maneuver.

Figure 2C:
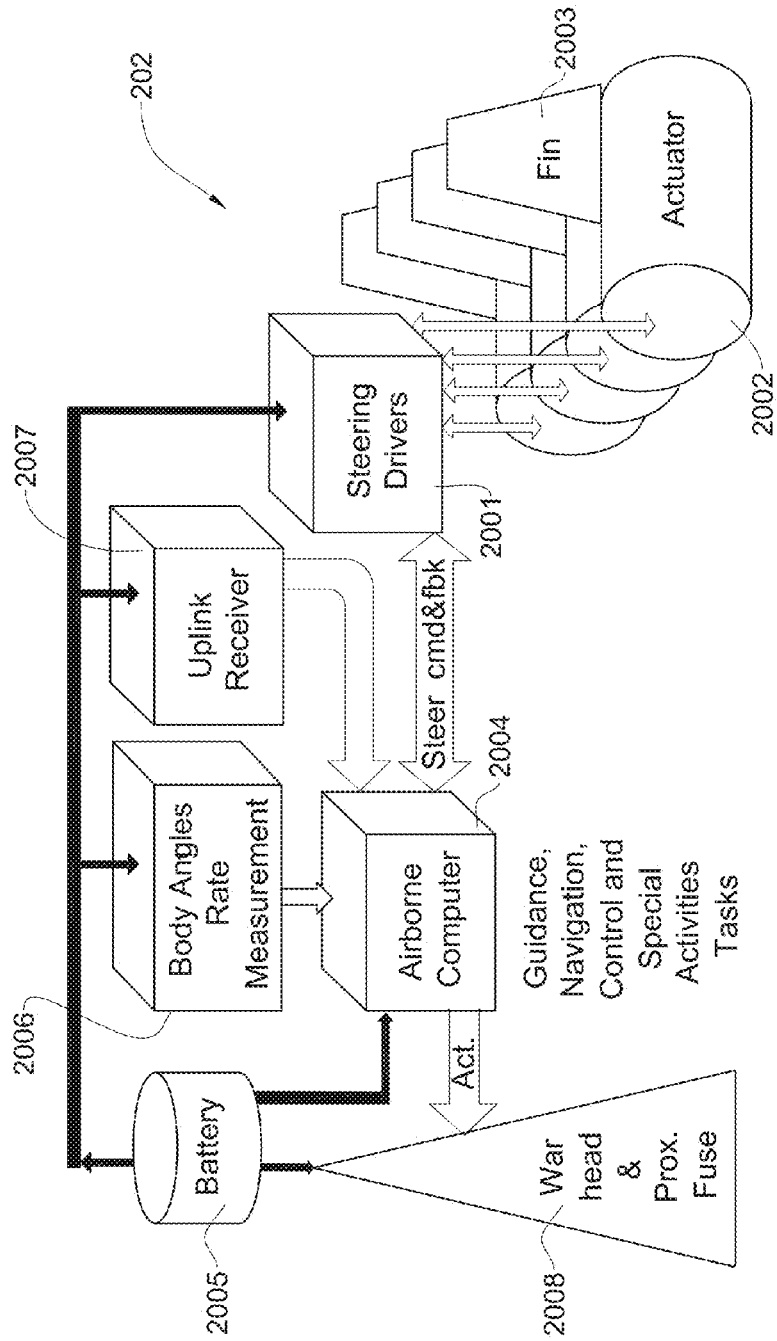
FIG. 2C illustrates airborne main section system architecture, in accordance with certain embodiments of the invention.

Turning now to FIG. 2C, it illustrates airborne main system architecture, in accordance with certain embodiments of the invention. Thus, as shown, steering system includes, by this embodiment, the steering drivers 2001 configured to command actuators 2002 which will actuate steering fins 2003, all as known per se.

Also shown, Airborne Computer 2004 (forming part of the navigation system) is powered by battery 2005 and receives feedback indicative of the steering fins 2003 (by means of the steering drivers 2001) and the body angle rate measurements module 2006 (forming part of the navigation system) determining an angular position of the missile in three mutually perpendicular axes. The Airborne Computer further receives inputs through uplink receiver 2007 and associated antenna (forming part of communication system) from the ground sensors for updating of the interceptor during flight (as will be explained in greater detail below). The Airborne computer 2004 processes all these data for (i) guidance task for diverting the interceptor missile toward the PIP by generating steering commands that are sent to the steering fins 2003 through the steering drivers, (ii) navigation task for determining the angular and linear position the interceptor missile during the flight (based on the angle rate measurements module 2006), (iii) control task for close loop control of the steering mechanism and (iv) the special activities task for activation of the separation between the main section and the engine section (not shown in FIG. 2C) of the interceptor missile and for the activation of the warhead and associated proximity fuse 2008.

Note that the invention is not bound by the specified system architecture.

Figure 3A:
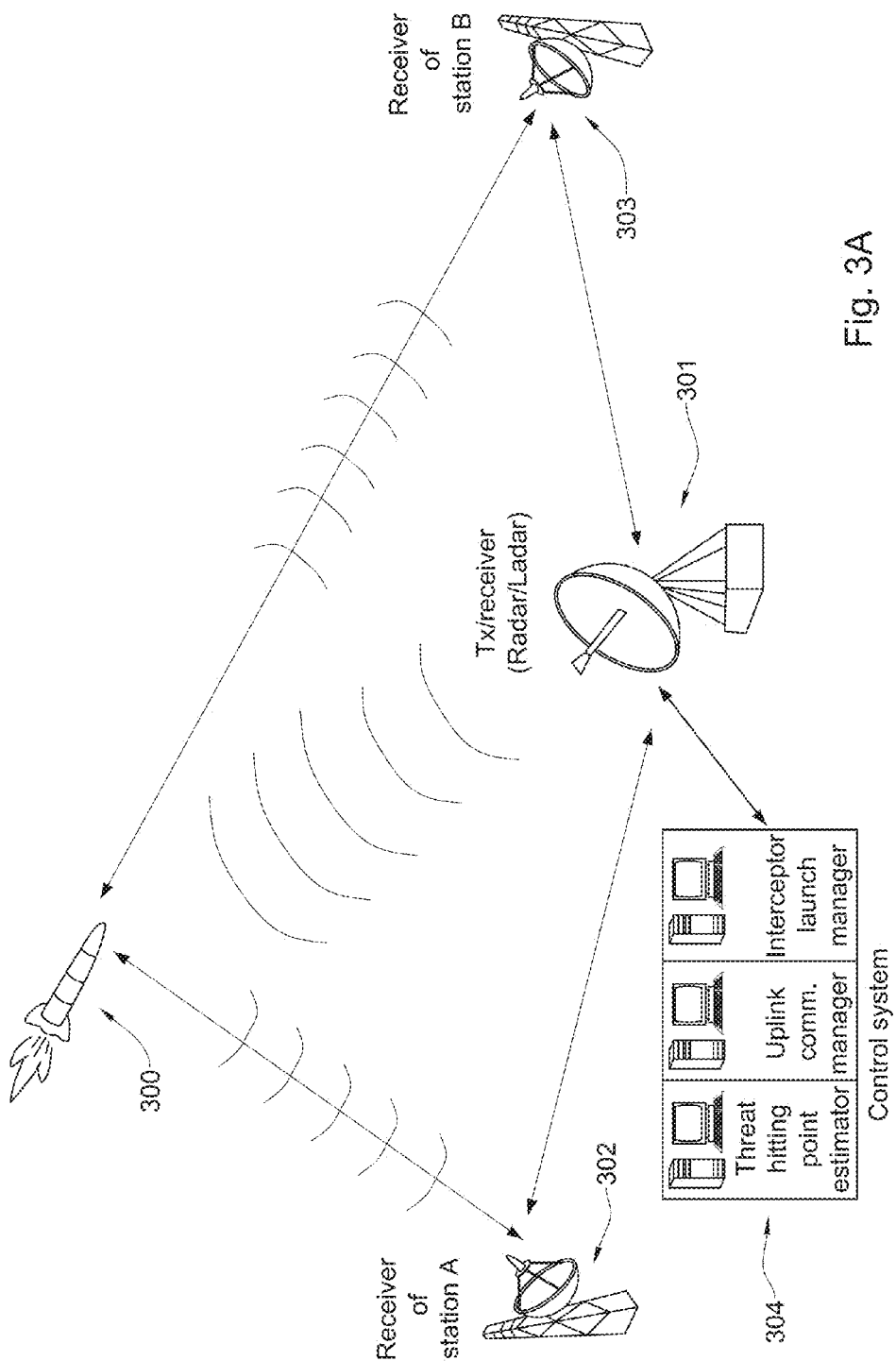
FIG. 3A illustrates a generalized detection and tracking scenario that is devoid of utilization of a seeker head, in accordance with certain embodiments of the invention.

Turning now to FIG. 3A, it illustrates a generalized detection and tracking scenario that is devoid of seeker head, in accordance with certain embodiments of the invention. Thus, a flying target rocket 300 is detected and tracked by an active sensor 301 (e.g. radar or ladar). Note incidentally that for convenience the term radar is mainly used herein but should be regarded by those skilled in the art as only an example of an active sensor.

The latter emanates radiation which is reflected by the flying target and received by the active sensor 301 and an additional two passive receiving sensors 302 and 303 whose locations are known in advance at decimeter level of accuracy. The specified three sensors (constituting a sensor array) are configured to utilize respective clocks at a relative synchronization accuracy of at least 1 nanosecond between each two of them and are capable of determining an updated flying rocket's location at a high accuracy of say less than a meter and therefrom the control system 304 is configured to determine an updated Predicted Interception Point (PIP) in which the interceptor will hit the target. The preliminary predicted interception point (PIP), a time of launch and interceptor missile separation time are transferred as a part of mission data to the interceptor (not shown) before launching. Updates of PIP are transferred to the interception during the flight via the uplink communication channel (not shown). The latter requires an estimation of the locations of both flying objects (rocket and interceptor) during their flights.

Note that in accordance with certain embodiments the preliminary mission data such as predicted PIP missile separation time (loaded to the interceptor before launch) may be determined based on active sensor only and later on during the flight trajectory of the target, say after the ascending section of the flight trajectory of the target; the passive sensors can also be utilized allowing determination of more accurate data such as updated PIP and updated separation time. The utilization of the passive sensors may for example depend on the specific threat definition and coverage of the passive antennae array.

Note that the determination of updated flying target and interceptor locations and updated PIP may be performed continuously at a desired rate, depending on the particular application.

Figure 3B:
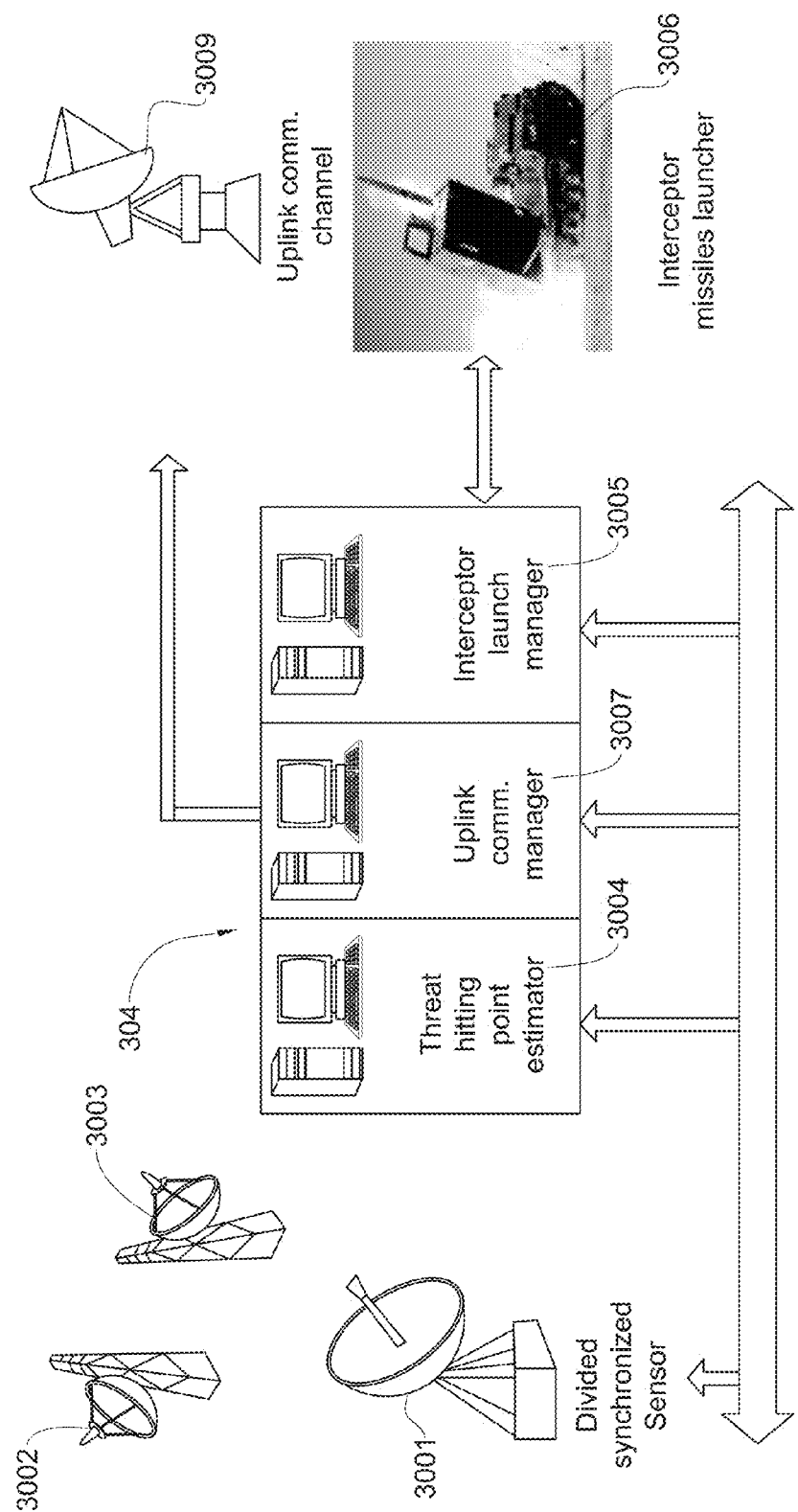
FIG. 3B illustrates ground control system architecture, in accordance with certain embodiments of the invention.

Turning now to FIG. 3B, it illustrates (a possible) ground control system architecture, in accordance with certain embodiments of the invention; As shown, active sensor 3001 and two passive sensors 3002 and 3003 are configured to determine the location of the flying target at high accuracy and send the data to the control system 304. The latter includes the Threat hitting point estimator system 3004 capable of calculating:

the PIP, the required launch timing of the interceptor missile and the required timing of interceptor missile separation during its flight.

The Threat hitting point estimator system 3004 transfers the noted above calculated parameters to the Interceptor launch manager system 3005 capable to generate a mission data that includes at least noted above parameters. The Interceptor launch manager transfers the calculated parameters to launching battery 3006, and they are finally loaded to the interceptor missile. Note that for determining the launch timing, the Threat hitting point estimator is also fed with the sensor's data indicating the precise location of the detected target rocket. Once the interceptor missile is launched, the threat hitting point system 3004 is fed also with accurate location data of the intercepting missile as determined by the ground sensors array. Based on the accurate location data of both the flying target and the interceptor missile, system 3004 is configured to calculate updated PIP and updated timing of interceptor missile separation and transmit it to the interceptor missile through uplink communication manager system 3007 and the specified data is transmitted through antenna 3008 to the interceptor missile (and received by uplink receiver module—see, e.g. 2007 in FIG. 2C), for further processing by the airborne computer on-board the missile. In addition, the launch time and the planned motor separation time are also transmitted to the missile.

Figure 4:
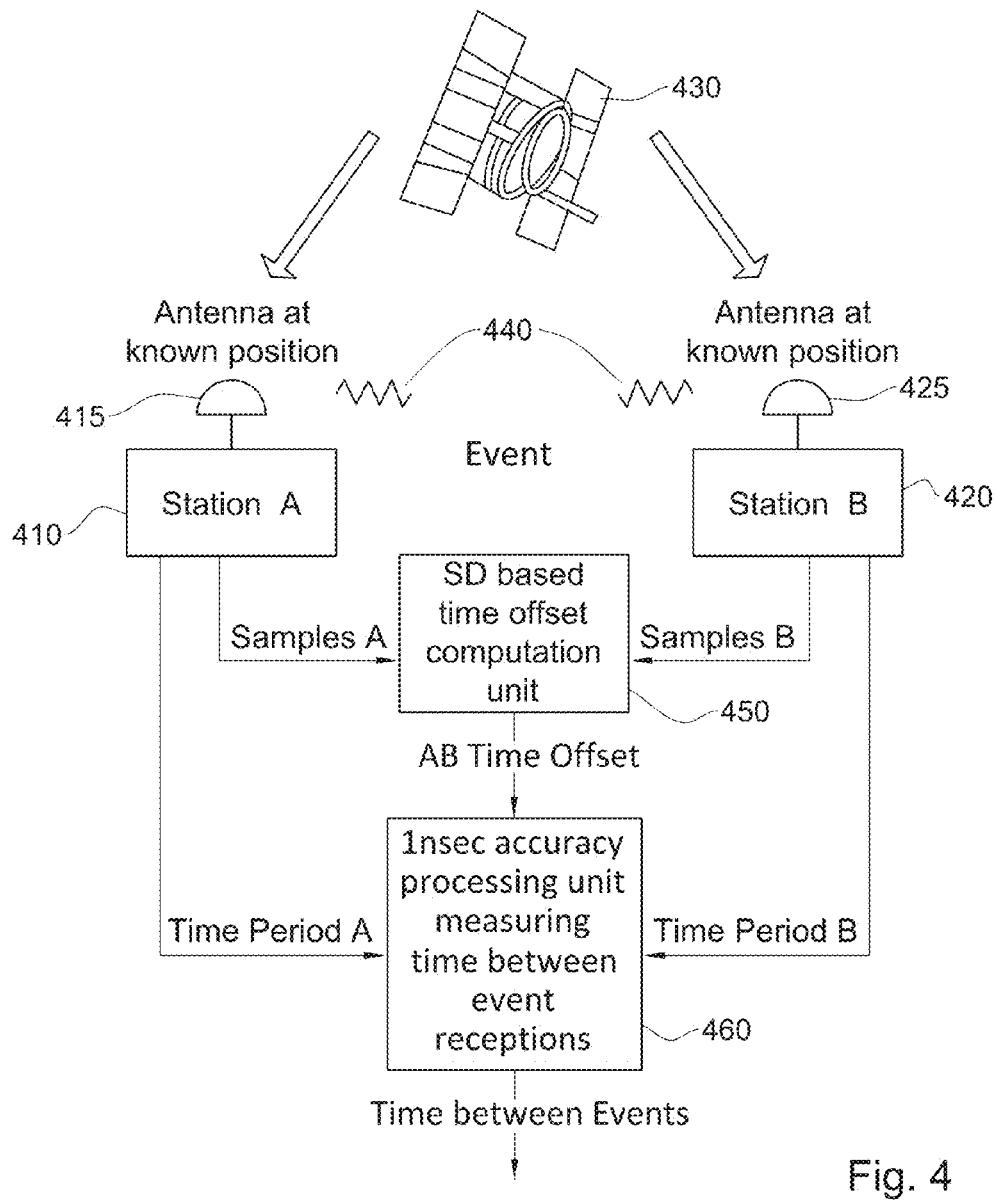
FIG. 4 illustrates schematically a block diagram for implementing accurate synchronization between clocks among sensors, in accordance with certain embodiments of the invention.

Reference is now made to FIG. 4 which is a simplified semi-pictorial semi-functional block diagram illustration of a system for Relative Time Measurement between two or more non-collocated stations 410 and 420 (e.g. any of the two specified sensors 301 to 303 of FIG. 3A) with decimeter level accuracy known coordinates, constructed and operative in accordance with certain embodiments of the present invention. Each station observes a Common External Signal (e.g. produced by GNSS satellite 430) via antennae 415 and 425 respectively. Each station produces time tag samples (pseudo range and integrated Doppler) based on a common external signal which may be generated by or generated responsive to a satellite 430. Each station senses a Common External Event 440 (for example reflection of beam originated by the active sensor power from the target) and computes a precise Time Period between a sensed external event time tag and the time tag of the latest of the samples.

A time offset Computation Unit 450 receives samples from stations A and B and computes a Time Offset between station 410's and 420's clocks at sampling time e.g. using Equations (a)-(d) below. The time offset information is provided to a nanosecond accuracy processing unit 460 which accurately measures time elapsing between events at stations A and B as described in detail below.

The time offset computation performed by unit 460 may be based on a conventional Single Difference (SD) algorithm e.g. as described in Bradford W. Parkinson and James J. Spilker, Global Positioning System: Theory and applications, Vol. II, Chapter 18, Eq. 9. An instant Time Offset is computed between the stations 410 and 420's internal time scales using coherent pseudo ranges and integrated Doppler Samples and the Known Positions of the stations' antennae 415 and 425.

Typically, the Single Difference (SD) algorithm implements the following linear combinations of coherent pseudo-range and carrier phase (integrated Doppler), as follows (Equations a and b):

$$P_{AB}^S = P_B^S - P_A^S = \rho_{AB}^S + \delta t_{AB} \cdot c + B_{AB} + I_{AB}^S + T_{AB}^S + \varepsilon^{Code} \quad (a)$$

$$\Phi_{AB}^S = \Phi_B^S - \Phi_A^S = \rho_{AB}^S + \delta t_{AB} \cdot c + B_{AB} - I_{AB}^S + T_{AB}^S + F_{AB}^S + \varepsilon^{Phase} \quad (b)$$

where samples A provided by station A of FIG. 3 include:

$P_A^S$—Pseudo-range measurement of satellite S (430 in FIG. 4) at station A, and $\Phi_A^S$—Carrier-phase measurement of satellite S (430 in FIG. 4) at station A. Samples B provided by station B of FIG. 3 include:

$P_B^S$—Pseudo-range measurement of satellite S (430 in FIG. 4) at station B, and $\Phi_B^S$—Carrier-phase measurement of satellite S (430 in FIG. 4) at station B. and wherein:

$\rho_{AB}^S$—Difference in Ranges between stations A and B and satellite S (430 in FIG. 4), C—Speed of light, $B_{AB}$—Difference between hardware delays between stations A and B, e.g. as computed by the calibration apparatus of FIG. 4 in PCT publication no. IL2010/000346, entitled "Relative Time Measurement System with nanosecond Level Accuracy" (hereinafter "The Time Sync Application") whose contents are incorporated herein by reference, and as described in detail below $I_{AB}^S$—Difference in ionospheric delays between stations A and B and satellite S (430 in FIG. 4), $T_{AB}^S$—Difference in tropospheric delays between stations A and B and satellite S (430 in FIG. 4), $F_{AB}^S$—Difference in floating ambiguities between stations A and B and satellite S (430 in FIG. 4), e.g. as computed by the calibration apparatus of FIG. 4 in "The Time Sync Application", $\varepsilon^{Code}$—Pseudo-range sampling noise, $\varepsilon^{Phase}$—Carrier Phase sampling noise, $\delta t_{AB}$—Time difference between stations A and B, e.g. as computed by Equation 5 described below=AB time offset of FIG. 4.

Parameter $\rho_{AB}^S$ is known based on satellite and stations' positions. Parameters $I_{AB}^S$ and $T_{AB}^S$ are modeled using standard procedures such as described in the above described textbook Global Positioning System: Theory and applications, at Vol. II, Chapter 18, Eq. 12, at Vol. I, Chapter 11, Eq. 20, and at Eq. 32. Relative bias $B_{AB}$ is a difference between hardware delays measured once per each pair of stations. This results in the following equations, which may be solved by the Computation Unit 450 using least squares techniques for unknown Time Offset $\delta t_{AB}$ and $F_{AB}^S$ respectively (Equations C and D):

$$\tilde{P}_{AB}^S = \delta t_{AB} \cdot c + \varepsilon^{Code} \quad (c)$$

$$\tilde{\Phi}_{AB}^S = \delta t_{AB} \cdot c + F_{AB}^S + \varepsilon^{Phase} \quad (d)$$

One method of operation for the nanosecond accuracy processing unit 460 of FIG. 4 is now described in detail.

Based on Time Period which may be computed by the sensor in stations 410 and 420, e.g. as per Equation F as described in detail in "The Time Sync Application", and based also on Time Offset between stations' clocks as derived by Equations C and D, Processing Unit 450 computes a Relative Time Measurement $dT_{EVENT}^{AB}$, also termed herein the "time between events", between stations 410 and 420, e.g. as per following equation E:

$$dT_{EVENT}^{AB} = T_{PERIOD}^{B} - T_{PERIOD}^{A} + \delta t_{AB} \qquad (e)$$

$dT_{EVENT}^{AB}$—Relative Time Measurement of event reception at stations A and B, also termed "precise relative time" or "time between events" (FIG. 4), $\delta t_{AB}$—Time Offset between station's clocks at sampling time, typically derived from Equations C and D by Computation Unit 450 as shown in FIG. 4.

$T_{PERIOD}^{A}$—Time Period between sensing of the external event (e.g. receiving of a pulse, originated by the active sensor and reflected by the flying object) by station A as described in "The Time Sync Application" (equation F). Also termed (e.g. in FIG. 4) "time period A", $T_{PERIOD}^{B}$—Time Period between sensing of the external event (e.g. receiving of a pulse, originated by the active sensor and reflected by the flying object) by station B as described in "The Time Sync Application" (equation F). Also termed (e.g. in FIG. 4) "time period B".

The structure and operation of each station for detecting offset of 1 nanosecond is described in detail with reference to FIGS. 2-5 of the specified "Time Sync Application".

Figure 5:
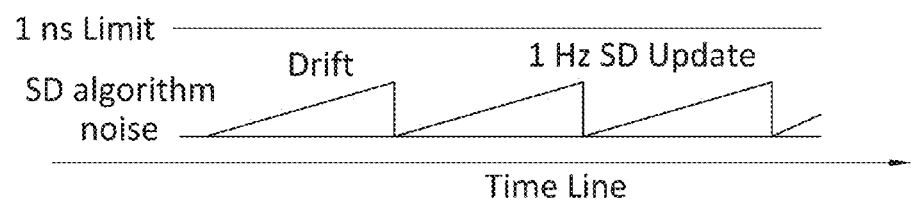
FIG. 5 is a chart illustrating synchronization results, in accordance with certain embodiments of the invention.

FIG. 5 shows the less than 1 nanosecond time offset.

Note that the said Relative Time Measurement is performed instantaneously and continuously at the desired events rate, depending upon the particular application.

Note also that the station in the specified application refers to a sensor of the present application, and that the time offset corresponds to the accuracy of a synchronized clock that is referred to in the present application.

Note also that the invention is not bound to achieving a time offset of up to 1 nanosecond in accordance with the teachings of "The Time Sync Application".

Note that the description with reference to FIGS. 4 and 5 describes achieving relative synchronization between two sensors at an accuracy of at least 1 nanosecond. The specified technique may be applied between any two sensors.

Note that the specified technique may be also applied between any passive sensor and the active sensor ("Star Configuration". The active sensor clock plays the role of "Master Clock").

Note also that the specified units 450 and 460 may form part of a synchronization unit forming part of the sensor array and may be implemented in module or module(s) that are integral with one or more of the specified sensors or separated therefrom.

Figure 6:
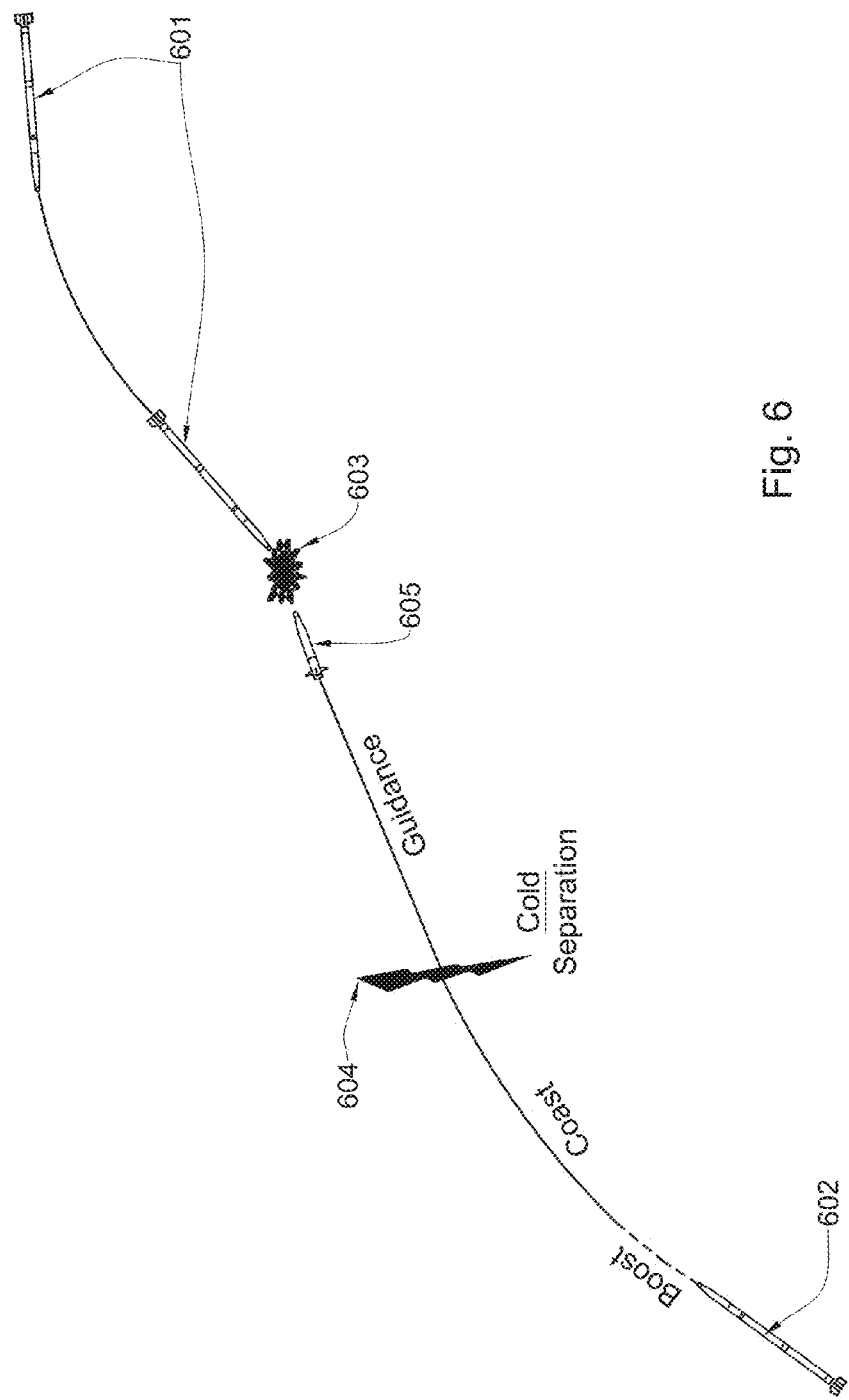
FIG. 6 illustrates a typical interception scenario, in accordance with certain embodiments of the invention.
Figure 7:
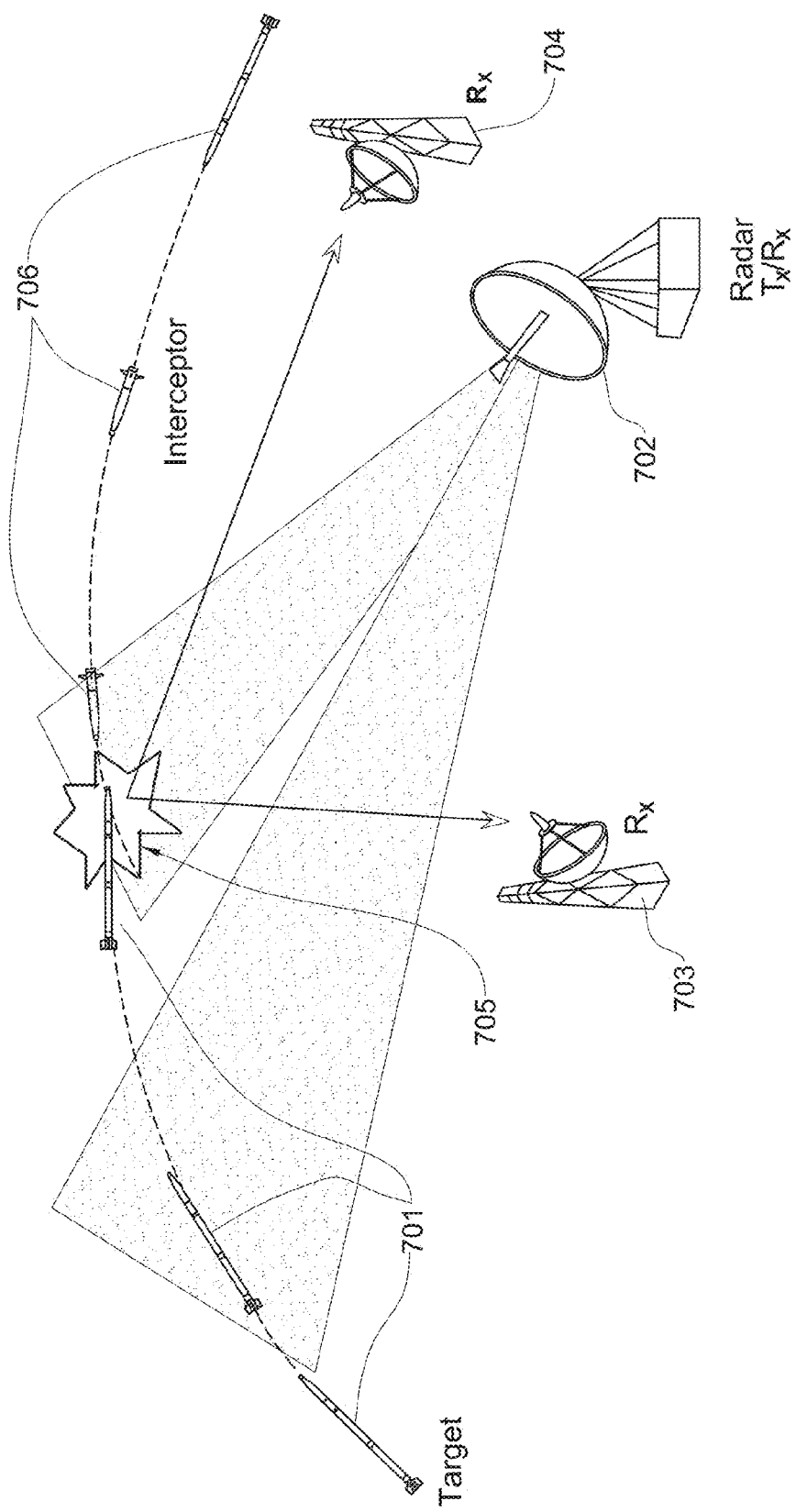
FIG. 7 illustrates an exemplary sensor array layout in an interception scenario, in accordance with certain embodiments of the invention.

Attention is now drawn to FIG. 6 illustrating a typical interception scenario, in accordance with certain embodiments of the invention and also to FIG. 7 illustrating an exemplary sensor array layout, in an interception scenario, in accordance with certain embodiments of the invention. Thus, a target rocket 601, 701 is detected and tracked at high accuracy utilizing the active sensor (e.g. radar 702) and the at least two passive sensors (703 and 704) (which in certain embodiments are utilized at a later stage of the target's flight, as discussed above), all being clock synchronized at a high accuracy of about 1 nanosecond, all as explained in detail above. The accurate updated location determination of the target is based, amongst others, on clock synchronization between the sensors, all as will be explained in greater detail below. Having accurately determined the updated location of the oncoming threat (601, 701) utilizing the specified sensors, the control system 304 (see FIG. 3A) is capable of calculating a planned flight trajectory of the interception missile (602,605,706) and updated Predicted Interception Point (PIP) (603,705) for interception of the flying threat. The control system 304 (see FIG. 3A) is also capable of establishing the mission data (not shown), transferred to the interception launcher (not shown) and including at least a preliminary PIP (603), a needed time of launch and a time of the separation between the interception missile's engine and main section. Thereafter, the interception missile (602, 605, 706) is launched (toward the PIP) and its updated location is accurately tracked by the specified sensors (702 to 704). As specified, utilization of the passive sensor gives rise to more accurate mission data (e.g. PIP and separation time).

Note that the control system 304 (see FIG. 3A) can update the PIP (603,705) which is based on the updated locations of the both flying target and the interceptor.

The updated PIP (603) and updated location of the interceptor are transmitted from the control system 304 (see FIG. 3A) to the interceptor missile (602, 605,706) at a desired rate depending upon the particular application.

Note that updated location of the interceptor missile may be used by the navigation task of interceptor's airborne computer (e.g. 2004 at FIG. 2C).

Note also that both updated PIP and the updated location of the interceptor may be used by guidance task of interceptor's airborne computer 2004.

Once the separation condition is achieved: e.g. time of flight of interceptor missile meets the separation time condition transmitted from the ground control system 304, the motor is separated 604 and the main section of the interceptor missile 605 proceeds forward. As has been explained with reference to FIG. 1B, at this stage the steering fins are extracted and serve the steering system for diverting of the interceptor toward the Predicted Interception Point (PIP). Note that steering towards the PIP should be understood as encompassing also steering substantially towards the vicinity of the PIP or hitting it.

The airborne computer 2004 (see FIG. 2C) receives updated navigation data from the onboard inertial measurement unit and external measurement of interceptor location by the uplink communication channel (using the communication system 2007—see FIG. 2C). Based on updated navigation solution and updated PIP (as received by the uplink communication system 2007—see FIG. 2C) the airborne computer propagates the guidance law (e.g. proportional navigation) and calculates appropriate steering commands for the steering system 2001-2003, see FIG. 2C (by the embodiment utilizing steering fins 107 see FIG. 2A) that will guide the interceptor missile toward the updated PIP.

Note that the steering commands are updated based on the updated PIP and updated location and orientation of the interceptor missile.

Note also that in accordance with certain embodiments the steering commands may be executed after engine separation 604.

Note that In accordance with certain embodiments, the interceptor separation time that forms part of the mission data, may be updated by control system 304 (see FIG. 3A) during the flight of the interceptor via uplink communication channel 2007 (see FIG. 2C).

In accordance with certain embodiments, the guidance rules which control the steering of the missile towards the PIP may comply (but not necessarily) e.g. with a known per se proportional navigation paradigm.

Reverting now to FIGS. 6 and 7, once the interception missile (605, 701) is sufficiently close to the updated PIP, the proximity fuse (see 105 in FIG. 1A) of the intercepting missile is activated (in response to a command originated by the airborne computer, or in accordance with a certain other embodiment by the ground control system—see 304 in FIG. 3A and operates in a known per se manner. Thus, in accordance with certain embodiments, the proximity fuse acquires the needed information and once it concludes that the interceptor missile is sufficiently close to the warhead of the target, it triggers the fragmentation warhead of the interceptor missile which detonates the explosive (fitted in the warhead) and kills the target (601,701). The target's warhead will be neutralized colliding with and being penetrated by the fragments (fitted in the interceptor's warhead) with appropriate mass/density characteristics in a known per se manner.

It should be noted that in accordance with certain embodiments due to the relatively small dimensions of the voluntary area of the GTG rocket, the minimal required fragments' density is about one lethal fragment per square decimeter. The known per se lethal tungsten fragment for the warhead destroying is at least 35-40 grams weight and has a closing velocity of at least about 1500 m/sec. It is recalled that in the specific case of the original GRAD missile, the latter carries a warhead of about 20 kilograms weight. In accordance with certain embodiments of the invention the interceptor missile is based on the GRAD engine and carries a warhead of about the same weight. Assume that the portion of fragments is about a half of the warhead section weight (the rest weight designates the explosive, warhead structure and the proximity fuse). It thus readily arises that the interceptor missile can carry about 250-300 lethal fragments. This amount is sufficient for generating of the fragments' beam with required density at the area of about 2.5-3 $m^2$ (equivalent to the area of the circle with a radius of 1 m). Reliable interception of the target by a very small vulnerable interceptor with a relatively small warhead can be achieved only by very accurate estimation of the interception point (the required miss distance is sub-meter level).

Note that the invention is not bound by the specified operational specifications which are provided for illustrative purposes only, and the latter may vary depending upon the particular application.

Note that using of MLRS solid motor for acceleration of the interceptor provides a capability for caring of sufficiently larger warhead.

Note also that the invention is not bound to any particular warhead and any known per se warhead that can achieve hitting and neutralization of a target warhead is applicable.

Note also that in accordance with certain embodiments any known per se lethality criteria for activating the warhead may be employed. Note that the lethality criterion may vary depending upon the nature of the target. Say, for a rocket, a different lethality criterion may be employed compared for instance to a UAV or aircraft.

Note also that the invention is not bound to any particular fuse proximity structure and any known per se active or semi active proximity fuse is applicable.

Note also that the invention is not bound to using the proximity fuse for triggering the interceptor's warhead and in other embodiments of the invention the uplink receiver (fitted into communication system of the interceptor 204 in FIG. 2A) may be designed to receive the echo of the uplink signal from the target. In this case the uplink receiver has an additional functionality of the proximity fuse.

Note also that the invention is not bound to using a proximity fuse for triggering the interceptor's warhead and in other embodiments of the invention the warhead is activated e.g. by a command originated by the ground control system (see 304 in FIG. 3). In this case the required timing of the warhead initialization will be included to the uplink message.

Figure 8:
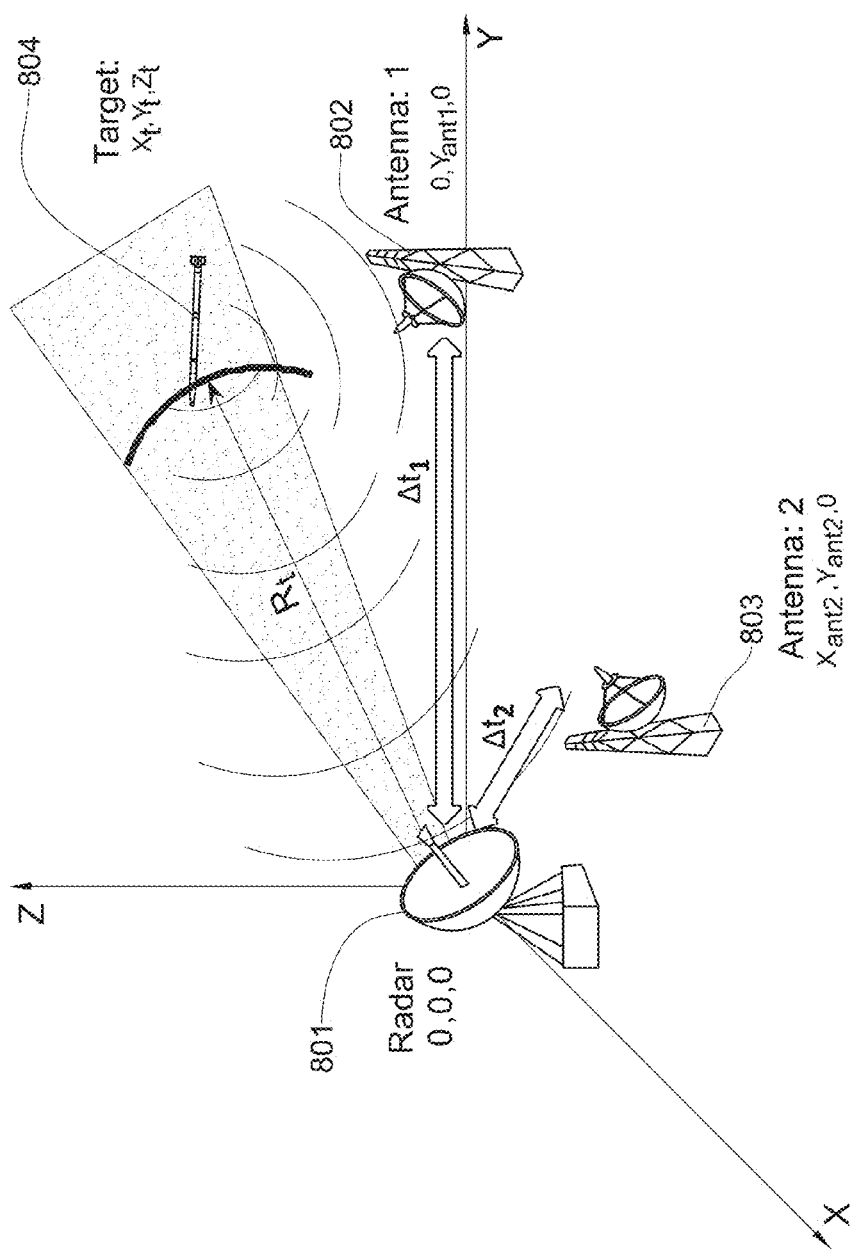
FIG. 8 illustrates a deployment scheme of a combined (radar and passive) sensor synchronized at a high accuracy, in accordance with certain embodiments of the invention.

Turning now to FIG. 8, it illustrates a deployment scheme of combined (radar and multi-static) sensor synchronized at a high accuracy of about 1 nanosecond, in accordance with certain embodiments of the invention.

Before turning to FIG. 8, it should be noted that Target location is measured by three independent highly accurate measurements:

Range ($R_t$) from Radar's location to target and is measured by the radar itself (at decimeter level), Time difference ($\Delta t_1$) the time difference between the reception times by the radar and antenna #1 of a signal that is emanated by the radar and reflected from the target. Note that the radar is located at origin of the coordinate system 801), the target is located at ($X_t$, $Y_t$, $Z_t$) 804 and antenna #1 is located at (0, $Y_{ant1}$, 0) 802. The time difference is measured by synchronization system (1 nanosecond level, equivalent to decimeter level measurement).

Time difference ($\Delta t_2$) the time difference between the reception times by the radar and antenna #2 of a signal that emanated by the radar and reflected from the target. Note that antenna #2 is located at ($X_{ant2}$, $Y_{ant2}$, 0) 803.

The instantaneous target location is determined by using the known per se Time Difference Of signal Arrival (TDOA) technique (see for example TDOA Localization Techniques IEEE 802.15-04a/572r0 ieee802.org/ . . . /15-04-0572-00-004a-tdoa-localization-techniques.ppt, October 2004), combined with the measurements of range to target. The target location measurement uncertainty volume is an intersection of:

Spherical layer with radius of $R_t$ and thickness equal to uncertainty of range measurement Hyperbolical layer $\Delta t_1$=constant and thickness equal to product of light velocity and uncertainty of synchronization of reflection power received by the radar and the passive antenna #1.

Hyperbolical layer $\Delta t_2$=constant and thickness equal to product of light velocity and uncertainty of synchronization of reflection power received by the radar and the passive antenna #2.

Accuracy of target trajectory estimation may be approved by implementation of e.g. known per se filtering procedure (Kalman Filter). This method uses the multiple results of target location measurements and predefined models of target kinematic behavior.

Accuracy of instantaneous measurement may be improved by using of e.g. the known per se TDOA-FDOA technique (noted above TDOA technique combined with Frequency Difference Of signal Arrival technique) that requires additional measurements of frequency shifting by the Doppler Effect. Effectiveness of noted improvement depends on:

Stability of frequency sources used at radar and passive antennae sites,

Radar signal type and signal processing (resolution of Range Doppler map).

Target kinematic characteristics (velocity, spin rate, Radar Cross Section pattern etc.).

The form of the noted above uncertainty volume of target location depends on deployment of the radar and the passive antennae. The known per se technique of geometric Dilution Of Precision—GDOP may be used (as an example) for optimization of divided sensor deployment (see for example Richard B. Langley (May 1999). "*Dilution of Precision*". *GPSWorld*. http://gauss.gge.unb.ca/papers.pdf/gpsworld.may99.pdf.

The special case of the plane deployment of the divided sensor is analyzed below. In this case all parts of the sensor array (radar and pair of passive antennae) are ground based and as a result the elongation of Vertical Dilution Of Precision (VDOP) is expected.

Figure 9:
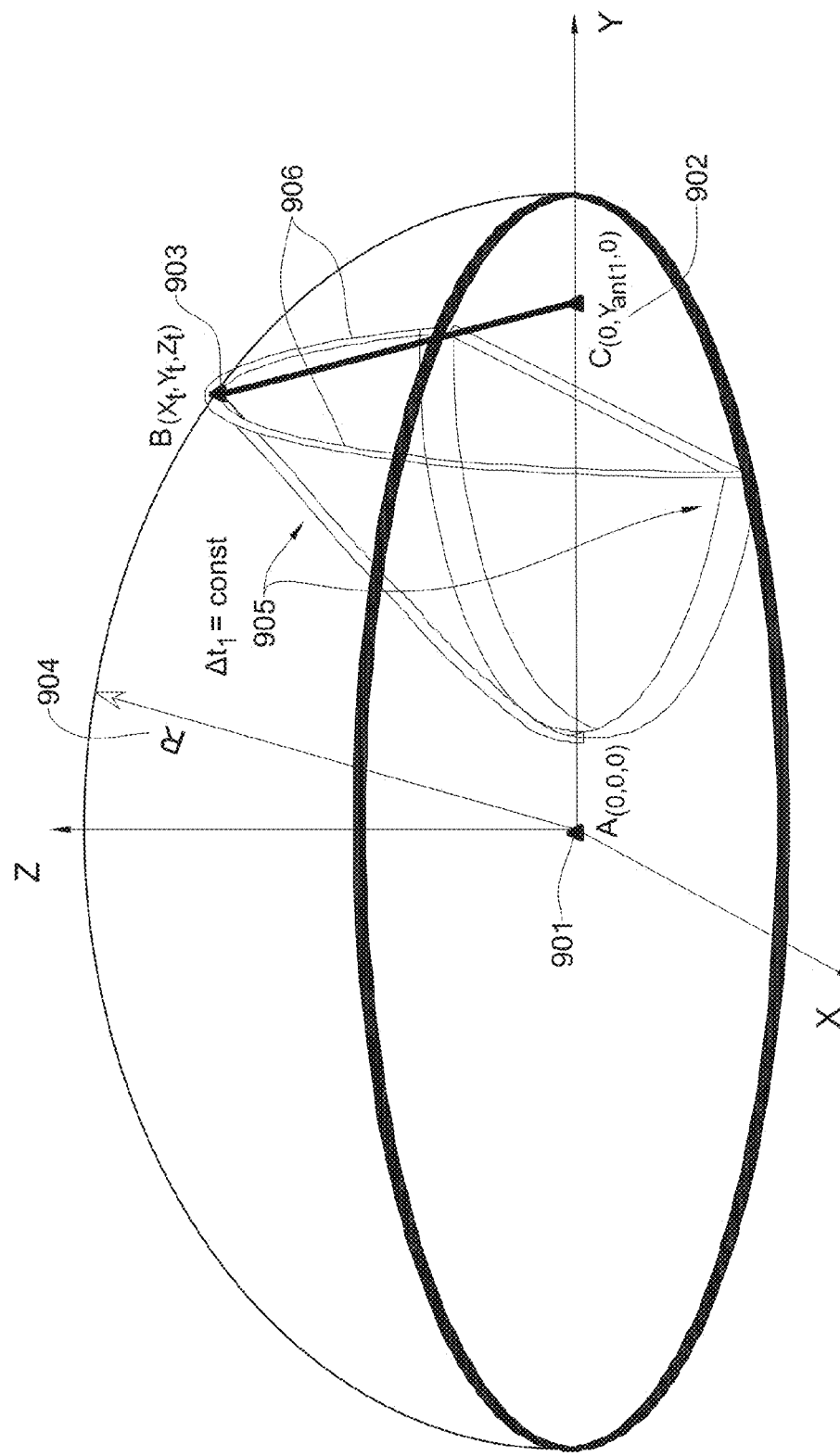
FIGS. 9, 9A-9B illustrate measurement of target at Y coordinate.
Figure 9A:
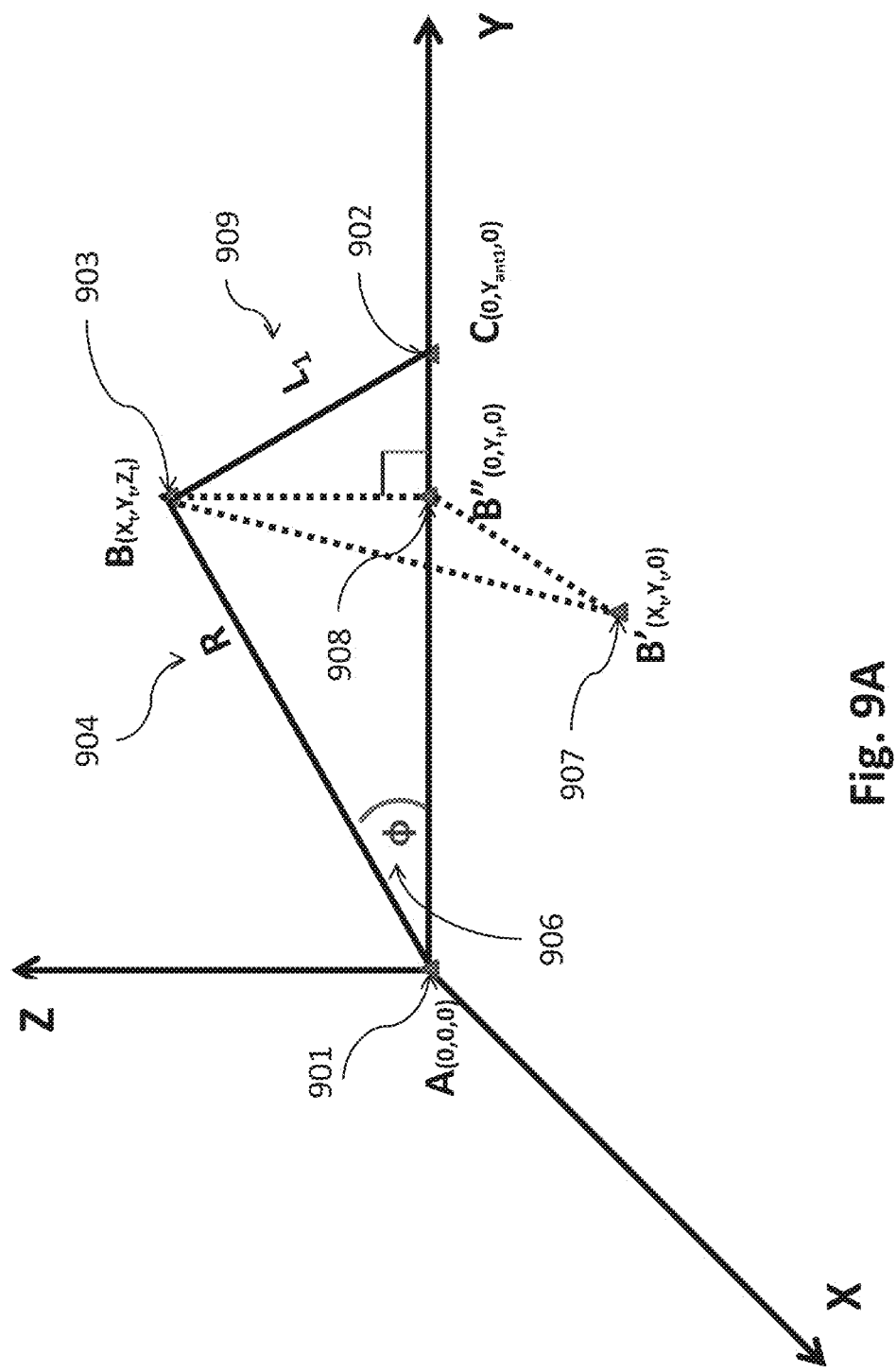
Figure 9B:
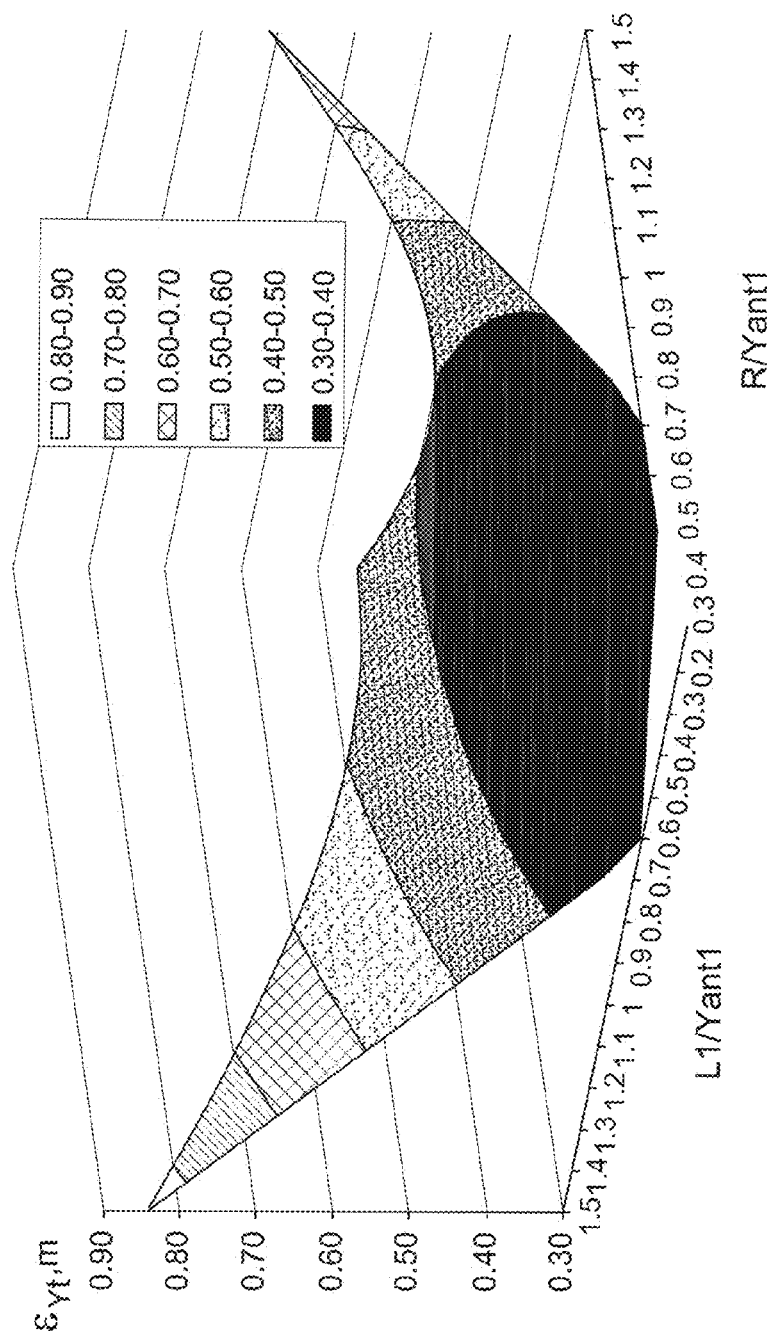

A method for calculation of a Y-coordinate of the target is illustrated by FIGS. 9, 9A and 9B. The noted above spherical layer with radius R (904) is generated by a range measurement by radar A (901) placed at a head of a coordinate system XYZ. The hyperbolic layer $\Delta t_1$=constant (905) is a place of points with the constant difference of the distances to the radar A (901) and a passive antenna C (902). The intersection between the noted sphere and hyperbolic layers generates a ring (906) of possible positions of a target B (903). Turning now to FIG. 9A, a triangle ABC is generated by a radar site A (901), 1st passive antenna site C (902) and a target B (903). The length of side AB is equal to range R (904), accurately measured by the radar, the length of side AC is equal to "Y" coordinate of 1-st passive antenna site $Y_{ant1}$ and the length of side BC (905) is equal to a distance $L_1$ of a traveling path of reflected by the target RF energy, originated by the radar. An angle $\varphi$ (909) is an angle BAC between side AB and AC (Y-axes). A point B' (907) is a projection of the target B on the XY-plane. Equation (1) presents a trigonometric relationship (cosines law) for ABC triangle:

$$R^2 + Y_{ant1}^2 - 2 \cdot R \cdot Y_{ant1} \cdot \cos(\varphi) = L_1^2 \quad (1)$$

The term $\cos(\varphi)$ can be calculated by ratio $$\frac{AB''}{R},$$

here B" (908) is a projection of point B on the Y axes (AB"=$Y_T$).

$$R^2 + Y_{ant1}^2 - 2 \cdot Y_{ant1} \cdot Y_T = L_1^2 \quad (2)$$

The distances R and R–$L_1$ are measured accurately by the sensor array. The noted above time difference ($\Delta t_1$) between receiving of the reflected by the target RF energy by the radar and the passive antenna #1 is connected to the distance R–$L_1$ by following relationship:

$$R - L_1 = c \cdot \Delta t_1, \text{ or } L_1 = R - c \cdot \Delta t_1, \quad (3)$$

Here c is a speed of light

Substituting of obtained terms for $L_1$ (equation 3) into relationship (2) provides the following equation for a Y-coordinate of a target:

$$Y_T = \frac{Y_{ant1}^2 - c^2 \Delta t_1^2}{2 \cdot Y_{ant1}} + \frac{R}{Y_{ant1}} \cdot C \cdot \Delta t_1 \quad (4)$$

Note that for obtaining a Y coordinate of the target $Y_T$ only 2 accurate measurements of the sensor array were used: range to target R and time difference between receiving of reflected by target RF energy by the radar and by the first passive antenna ($\Delta t_1$).

First order approximation of an accuracy of target's Y coordinate ($\varepsilon_{Y_t}$) determination is presented by the following equation:

$$\varepsilon_{Y_t} \sim \frac{c}{Y_{ant1}} \cdot \sqrt{(\varepsilon_t \cdot L_1)^2 + (\varepsilon_R \cdot \Delta t_1)^2} \quad (5)$$

Here $\varepsilon_t$ and $\varepsilon_R$ are independent accuracies of the measurements of time difference and a range correspondingly.

The following rule provides a capability for a decimeter level accuracy determination of the Y coordinate of the target: the first passive antenna should be placed close to the area of potential interception points ($L_1 \sim Y_{ant1}$) and relatively far from the radar site ($Y_{ant1} \sim R_t$).

FIG. 9B illustrates a dependency of the accuracy of determination of the Y coordinate of the target on the main parameters of the radar and passive antenna deployment ($L_1/Y_{ant1}$ and $R_t/Y_{ant1}$). The noted above accuracy is kept on the level of 0.5-0.6 in the case of $L_1/Y_{ant1} < 1.5$ & $R_t/Y_{ant1} < 1.5$.

Note that the discussion with reference to FIGS. 8 and 9, 9A-9B is provided for illustrative purposes and accordingly those versed in the art will readily appreciate that various numerical and specific parameters that were described are by no means binding.

Figure 10:
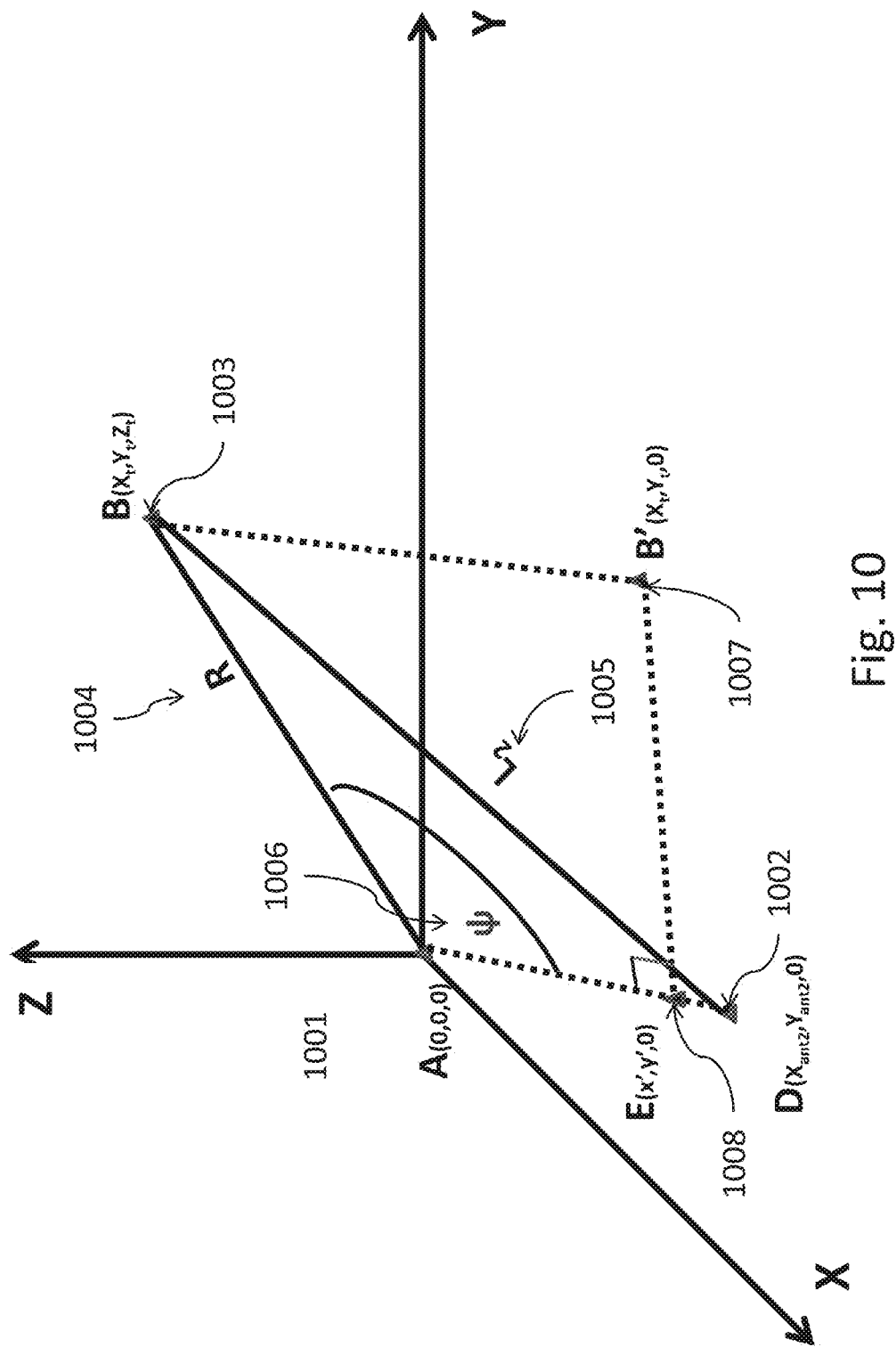
FIG. 10 illustrates measurement of target at X coordinate.

FIG. 10 illustrates a method for calculation of X-coordinate of the target. A triangle ABD is generated by a radar site 1001, 2-nd passive antenna site 1002 and a target 1003. The length of side AB is equal to range R (1004), accurately measured by the radar, the length of side AD is equal to distance of 2-nd passive antenna site from the radar site $\sqrt{(X_{ant2}^2 + Y_{ant2}^2)}$ and the length of site DB (1005) is equal to a distance $L_2$ of a traveling path of reflected by the target RF energy emanated by the active sensor 1001. A point B' (1007) is a projection of the target B on the XY-plane. Equation (6) presents a well known trigonometric relationship (cosines law) for an ABD triangle:

$$R^2 + X_{Ant2}^2 + Y_{Ant2}^2 - 2 \cdot R \cdot \sqrt{(X_{ant2}^2 + Y_{ant2}^2)} \cdot \cos(\psi) = L_2^2 \quad (6)$$

The term $\cos(\psi)$ can be calculated by ratio AE/R, here E (1008) is projection of point B' to the side AD:

$$AE = \frac{X_t \cdot X_{ant2} + Y_t \cdot Y_{ant2}}{\sqrt{X_{ant2}^2 + Y_{ant2}^2}} \quad (7)$$

Equation (8) presents the relationship for calculation the X coordinate of the target:

$$X_T = \frac{X_{ant2}^2 + Y_{ant2}^2 - c^2 \cdot \Delta t_2^2}{2 \cdot X_{ant2}} + \frac{R \cdot c \cdot \Delta t_2}{X_{ant2}} - \frac{Y_t \cdot Y_{ant2}}{X_{ant2}} \quad (8)$$

The range R and the time difference $\Delta t_2$ are measured accurately by the sensor array. The Y coordinate of the target $Y_t$ is determined by equation (4).

Note that for obtaining of a X coordinate of the target $X_T$ all 3 accurate measurements of the divided ground sensor were used:

Range to target R,

Time difference between receiving of reflected by the target RF energy by the radar and by the first passive antenna ($\Delta t_1$) for obtaining the Y coordinate of the target.

Time difference between receiving of reflected by the target RF energy by the radar and by the second passive antenna ($\Delta t_2$).

First order approximation of an accuracy of target's X coordinate ($\varepsilon_{X_t}$) determination is presented by following equation:

$$\varepsilon_{X_t} \sim \sqrt{\frac{c^2}{X_{ant2}^2} \cdot (\varepsilon_t^2 \cdot L_2^2 + \varepsilon_R^2 \cdot \Delta t_2^2) + \frac{Y_{ant2}^2}{X_{ant2}^2} \cdot \varepsilon_{Y_t}^2}, \quad (9)$$

Here $\varepsilon_t$ and $\varepsilon_R$ are accuracies of the measurements of time difference and range correspondingly.

The following rule provides capability for a decimeter level accuracy determination of the X coordinate of the target: the second passive antenna should be placed close to X-axes of the chosen coordinate system ($Y_{ant2} \ll X_{ant2}$). In this case the relationship for the uncertainties of determining of X coordinate of the target has the following form:

$$\varepsilon_{X_t} \sim \frac{c}{X_{ant2}} \cdot \sqrt{\varepsilon_t^2 \cdot L_2^2 + \varepsilon_R^2 \cdot \Delta t_2^2}, \quad (10)$$

In the case of orthogonal deployment of the combined radar and multi static array ($Y_{ant2}=0$), the expression for the accuracy of determination of the X coordinate of the target (10) is similar to the expression for the accuracy of determination of the Y coordinate of the target (5). In accordance with certain embodiments, the following rule provides a capability for a decimeter level accuracy determination of the X coordinate of the target: the second passive antenna should be placed relatively far from the radar site ($X_{ant2} \sim R_t$) and relatively close to the area of potential interception points ($X_{ant2} \sim L_2$). Dependency of the accuracy of determination of X coordinate of the target on the main parameters of second passive antenna deployment is similar to the dependency of the accuracy of Y coordinate: the noted above accuracy is kept on the level of 0.5-0.6 in the case of L2/Yant2<1.5 & Rt/Yant2<1.5 (see FIG. 9B).

$R_t/X_{ant2}, L_2/X_{ant2}$ In the case of non-orthogonal deployment of the combined radar and multi static array, the expression for the accuracy of determination of the X coordinate of the target (9) includes additional term $$\left(\frac{Y_{ant2}^2}{X_{ant2}^2} \cdot \varepsilon_{Y_t}^2\right).$$

This term decreases the accuracy of determination of the X coordinate of the target. For example, in the case of deployment of the passive antennae with the angle of 60° in respect to the radar ($Y_{ant2}^2/X_{ant2}^2=(1/\tan 60°)^2=\frac{1}{3}$), the accuracy of determination of X coordinate of the target will be about 15%- $\sqrt{1.333}-1$, less accurate relative to the optimal orthogonal deployment.

Substituting of obtained terms for $Y_t$ (equation 5) and $X_t$ (equation 8) coordinates of the target into the equation for the range allows calculation of the last target coordinate ($Z_t$):

$$Z_t = \sqrt{R_t^2 - Y_t^2 - X_t^2} = \qquad (11)$$

$$\sqrt{R_t^2 - \left(\frac{\frac{1}{2} \cdot (X_{ant2}^2 + Y_{ant2}^2 - c^2 \cdot \Delta t_2^2) + R \cdot c \cdot \Delta t_2 - Y_t \cdot Y_{ant2}}{X_{ant2}}\right)^2 - \left(\frac{\frac{1}{2} \cdot (Y_{ant1}^2 - c^2 \cdot \Delta t_1^2) + R \cdot c \cdot \Delta t_1}{Y_{ant1}}\right)^2},$$

If the sensor array is deployed according to the formulated above rules:

$Y_{ant1} \sim R_t$, $X_{ant2} \sim R_t$, $Y_{ant2} \ll Y_{ant1}$, the equation for Z-coordinate of the target has the following form:

$$Z_t = \sqrt{R_t^2 - \left(\frac{\frac{1}{2} \cdot (X_{ant2}^2 - c^2 \cdot \Delta t_2^2) + R \cdot c \cdot \Delta t_2}{X_{ant2}}\right)^2 - \left(\frac{\frac{1}{2} \cdot (Y_{ant1}^2 - c^2 \cdot \Delta t_1^2) + R \cdot c \cdot \Delta t_1}{Y_{ant1}}\right)^2}, \quad (11')$$

An accuracy of determination Z coordinate of the target can be estimated by the following equation:

$$\varepsilon_Z = \frac{Z_{max}^2 - Z_{min}^2}{2 \cdot Z_t} \qquad (12)$$

$$= \frac{(R_{max}^2 - X_{min}^2 - Y_{min}^2) - (R_{min}^2 - X_{max}^2 - Y_{max}^2)}{2 \cdot Z_t}$$

$$= \frac{R_t}{Z_t} \cdot \varepsilon_R + \frac{X_t}{Z_t} \cdot \varepsilon_X + \frac{Y}{Z_t} \cdot \varepsilon_Y,$$

Accuracy of the target's Z-coordinate determination improves with increasing of the targets altitude ($Z_t$), thus interception of the target close to its apogee is preferable. High acceleration during the interceptor missile boost phase can significantly improve a system time budget. Rocket solid motors (for example, the motor of GRAD or MLRS rockets) are usually designed for extremely short burning time and can be useful as a low cost propulsion part of the interceptor. Equation 13 outlines a different form of equation 12:

$$\varepsilon_Z = \frac{R_t}{Z_t} \cdot \varepsilon_R + \frac{X_t}{Z_t} \cdot \varepsilon_X + \frac{Y_t}{Z_t} \cdot \varepsilon_Y \qquad (13)$$

What remains to finalize the deployment of the sensor's array layout is the location of the active sensor (e.g. radar).

As before, it is desired to reduce $\varepsilon_z$ (see equation 13) in order to secure hitting the target. Before moving on, it is recalled that shortly after the detection of the flying GRAD threat, the interceptor missile (e.g. powered by GRAD or MLRS motor) is launched towards the target from a launching site. Both fly at substantially the same speed and substantially along known trajectories, which substantially prescribe the predicted interception point.

Reverting to equation 13, the lower the expression $R_t/Z_t$, the larger the $\varepsilon_z$ (the other variables including $Z_t$ are substantially known). This stipulates that the target range $R_t$ should be smaller. Assuming that by certain embodiments the radar cannot view backwardly, then the most advantageous location would be substantially underneath the predicted interception point. In certain embodiments, the radar can view backwardly, implying thus that it can be deployed farther than the PIP.

In an exemplary interception scenario, the target acquisition starts at the relatively low ascent part of target trajectory (elevation angle of the target is less 20 degrees, $R_t/Z_t$~3÷10). The contribution of the passive antennae array to the improving of the target location accuracy is limited by factor $R_t/Z_t$. It is sufficient for the definition of PIP, generation of mission data and launching of the interceptor towards the PIP but not enough for meeting the lethality criterion for destroying the target (e.g. hitting the target). Along the target trajectory the elevation angle of radar beam rises up and e.g. at the apogee of the target can reach about 45 degrees ($R_t/Z_t$~1.4). As a result, the accuracy of the measurement of the target location significantly improves: the expected accuracies of determination of X and Y coordinates of the target location (according to the equations 5 and 10) are close to the 0.5÷1 meter and of Z coordinate of the target (according to the equation 13) is close to 2÷2.5 meters. At the descent part of the target trajectory the elevation angle of the radar beam increases continuously and can reach e.g. about 60 degrees at the region of potential interception points ($R_t/Z_t$~1.15). The measurements of X and Y coordinates remain to be very accurate (0.5÷1 meter level) and accuracy of measurement of Z coordinate of the target reaches a level of 1.5÷2 meters. The volume of uncertainty of target location is small enough (1÷2 m$^3$) for secure hitting of the target warhead by the beam of fragments generated by the interceptor with relatively small warhead (containing, like noted above, about 250-300 lethal fragments). Note that the invention is not bound by the specified exemplary scenario and in particular not by the specific numerical parameters outlined in the scenario.

The net effect is this that optimal deployment in accordance with certain embodiments of the invention stipulates that the first passive antenna will be deployed in the direction that falls in the sector from which the oncoming threat is likely to arrive and at coordinates (0,$Y_{ant1}$,0). The direction is from the active sensor to the first antenna. The second antenna will be deployed close to perpendicular direction e.g. at coordinates ($X_{ant2}$, $Y_{ant2}$,0) where $Y_{ant2} \ll Y_{ant1}$ and that the radar will be placed as far as possible, preferably (in the case of a radar that is devoid of backward view) underneath the predicted interception point (and in the case of backwardly viewing radar, further than the PIP) in order to decrease the range to target R and that $Y_{ant1}$~$R_t$ and $X_{ant2}$~$R_t$. Note that ~ is indicative of up to say 1.5 times, e.g. if the range to target from the radar site is 15 Km then the distances $Y_{ant1}$ and $X_{ant2}$ could be at least 10 Km.

Note that the discussion with reference to FIG. 10 is provided for illustrative purposes and accordingly those versed in the art will readily appreciate that various numerical and specific parameters that were described are by no means binding.

Figure 11A:
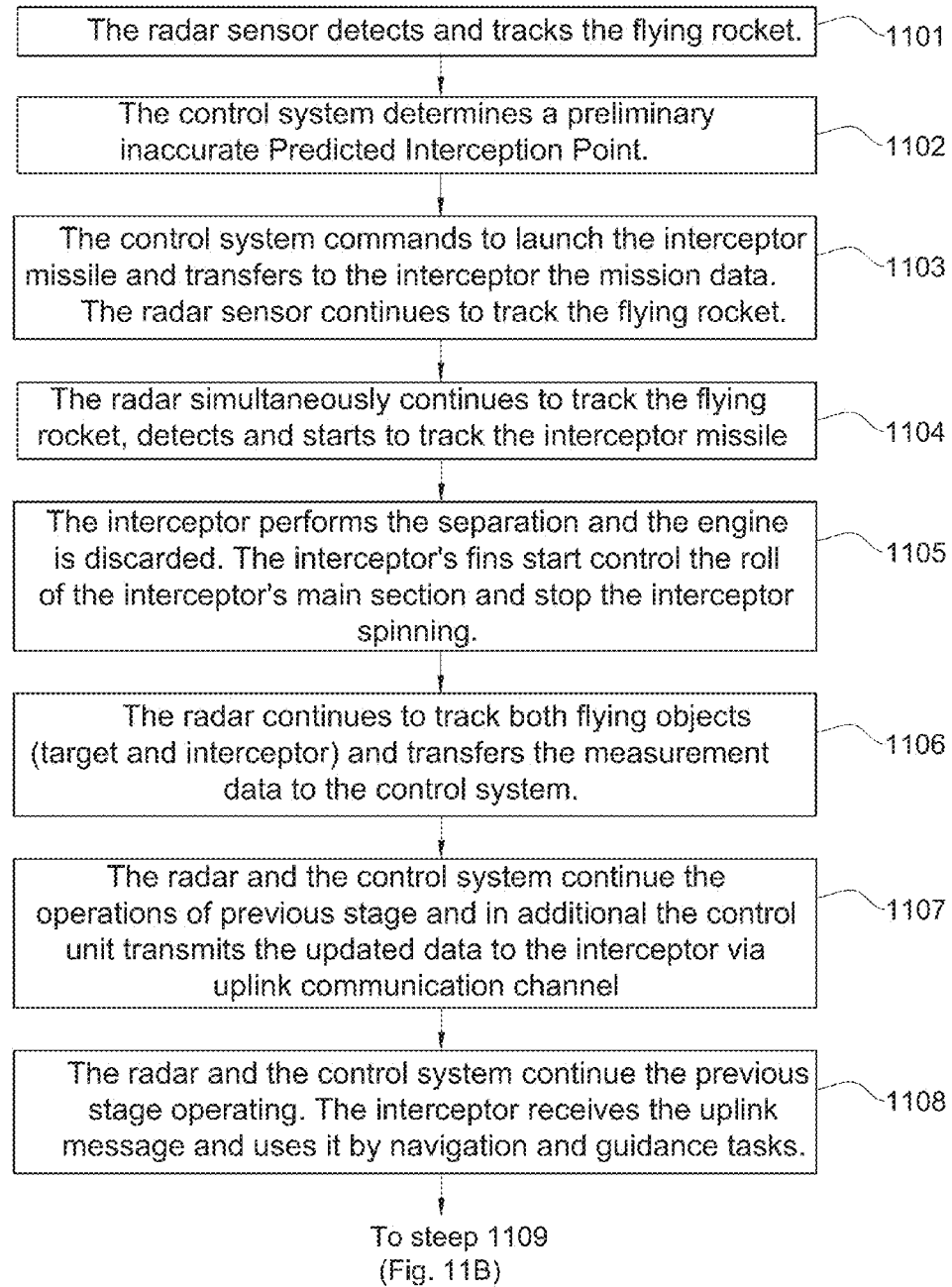
FIGS. 11A and 11B illustrate a sequence of operations, in accordance with certain embodiments of the invention.
Figure 11B:
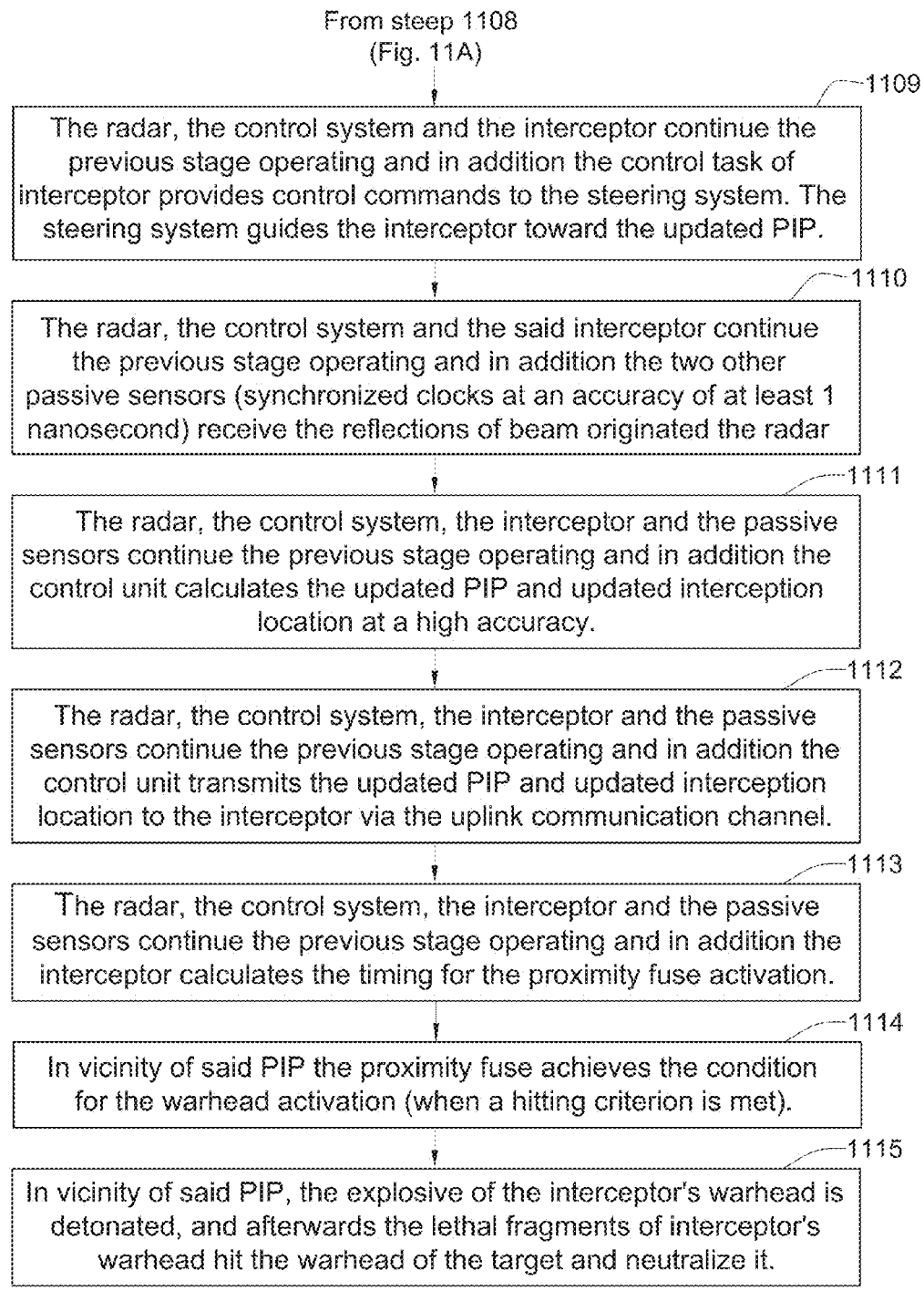

Turning now to FIGS. 11A and 11B which illustrate a sequence of operations, in accordance with certain embodiments of the invention.

Thus, at stage 1101, the radar sensor detects and tracks the flying rocket.

At stage 1102 the control system determines a preliminary inaccurate Predicted Interception Point.

At stage 1103 said control system commands to launch the interceptor missile and transfers to the interceptor the mission data that includes at least required time of launch, inaccurate PIP and required time of interceptor separation. The radar sensor continues to track the flying rocket.

At stage 1104 the radar simultaneously continues to track the flying rocket, detects and starts to track the interceptor missile. The radar sensor transfers the measurement data (tracks) to the said control system. The control system calculates the updated target rocket and interceptor missile state vectors (locations and velocities) as well as updated predicted interception point.

At stage 1105 the interceptor performs the separation and the engine is discarded. The interceptor's fins start control of the roll of the interceptor's main section and stop the interceptor spinning. Interceptor's uplink receiver is ready for communication.

At stage 1106 the radar continues to track both flying objects (target and interceptor) and transfers the measurement data to the control system. The control system continues updating the state vectors of the target and interceptor and calculates the updated PIP.

At stage 1107 the radar and the control system continue the operations of the previous stage, and, in addition, the control unit transmits the updated data to the interceptor via uplink communication channel. The uplink message includes at least updated location of the interceptor missile (using by navigation task of the airborne computer of the interceptor missile) and updated PIP (using by the guidance task of the airborne computer of the interception missile).

At stage 1108 the radar and the control system continue operation of the previous stage. The interceptor receives the uplink message and uses it by implementing navigation and guidance tasks.

At stage 1109 the radar, the control system and the interceptor continue operation of the previous stage and in addition the control task of interceptor provides steering commands to the steering system. The steering system guides the interceptor toward the updated PIP.

At stage 1110 the radar, the control system and the said interceptor continue operating of the previous stage and in addition the two other passive sensors (synchronized clocks at an accuracy of at least 1 nanosecond) receive the reflections of beam originated by the radar. The time differences between receiving the echo by the radar, and by the passive sensors, is transferred to the control system.

At stage 1111 the radar, the control system, the interceptor and the passive sensors continue operating the previous stage and in addition the control unit calculates the updated PIP and updated interception location at a high accuracy.

At stage 1112 the radar, the control system, the interceptor and the passive sensors continue operating the previous stage and in addition the control unit transmits the updated PIP and updated interception location to the interceptor via the uplink communication channel.

At stage 1113 the radar, the control system, the interceptor and the passive sensors continue operating the previous stage and in addition the interceptor calculates the timing for the proximity fuse activation.

At stage 1114 in vicinity of said PIP the proximity fuse achieves the condition for the warhead activation (when a hitting condition is met).

At stage 1115 in vicinity of said PIP, the explosive of the interceptor's warhead is detonated, and afterwards the lethal fragments of interceptor's warhead hit the warhead of the target and neutralize it.

Note that in other embodiments of the invention any other type of active sensor (e.g. ladar) may be used at the defense system configuration.

Note that the invention is not bound by the utilization of a sensor array that includes an active sensor and two passive sensors e.g. a sensor array may include 3 timeshared active radars where each of them can play a role of active sensor and two others a role of passive antennae.

Note that in accordance with certain embodiments at least one of said passive sensors is a stationary ground sensor. In accordance with certain embodiments at least one of said passive sensors is fitted on a mobile platform, e.g. the interceptor missile. In this case the passive sensor may have an additional functionality of precise semi-active proximity fuze.

Note also that in other embodiments of the invention the said two passive sensors may start receiving the echo from the target during any stages preceding 1110 (1102 to 1109).

Note also that in other embodiments of the invention the uplink receiver plays the role of the said proximity fuse and provides the required information to the airborne computer. The warhead is activated in this case by the command originated by the airborne computer.

Note also that in other embodiments of the invention the timing of warhead activation is calculated by the ground control unit and transmitted to the interceptor missile via the uplink communication channel. The warhead is activated in this case also by the command originated by the airborne computer.

There is further provided in accordance with certain embodiments, a threat hitting point estimator and in case that the hitting point is of no interest (in other words threat is incapable of hitting the defense area), said control unit is configured to refrain from commanding the launcher to launch said interceptor missile.

Note that in accordance with certain embodiments, said active sensor (e.g. radar) can detect and track more than one oncoming threat and more than one interceptor.

Note than in accordance with certain embodiments, the ground control unit can manage more than one interception process and can prioritize threats, e.g. according to the estimated hitting point of the rocket.

In accordance with certain embodiments, the burden posed on the active sensor (e.g. radar) may be alleviated. Thus radar's tasks may be allocated to detecting and tracking only the oncoming threat(s) and the need to track the interceptor missile (for determining its accurate location) may be obviated. This may be advantageous, e.g. in the case of tracking a salvo of many simultaneously launched rockets. By this embodiment, the data that is required for determining the location of the interceptor (as discussed in detail above) will not be obtained by receiving reflection of a beam originated by the radar but rather from another source, for instance a transmitter fitted on the interceptor which transmits a signal that is received by the passive sensors and will allow the control system to determine an updated location of the interceptor, or e.g. processing received the echo from the interceptor). Additional passive receiver(s) may be needed for this configuration of the defense system.

Note that in accordance with certain embodiments, there is provided at least one launcher battery (not shown) each including at least two interceptor missiles for intercepting at least two simultaneously flying objects.

Note that in accordance with certain embodiments the following advantage is achieved by utilizing a seeker-less interceptor. Thus, in interceptors that utilize a seeker, typically the case is that up to a certain point of the flight trajectory (of the interceptor toward the target) the guidance commands are controlled by a remote ground station and the on board seeker is not activated because the target is beyond the operational range of the seeker. The ground station, although remotely located, employs adequate equipment (e.g. radar) for sensing the target and guiding the interceptor thereto. Note that the longer the distance between the ground station and the target, the larger are the errors (especially cross-range errors) in accurate determination of the target location. At a certain stage when the interceptor is sufficiently close to the target, the on-board seeker is activated and replaces the ground station by sensing the target and being in charge of issuing an appropriate guidance command. However, a typical case may be that when the seeker takes control, the interceptor is already quite close to the target and is capable of determining the target's location at higher accuracy than that determined by the remote ground station. The discrepancy in the locations of the target (called "hand over error") requires, in certain cases, that the interceptor missile should employ very high agility characteristics, for maneuvering the platform at homing stage (based on the new locations as determined by the seeker) and this is within a relatively short distance from the target. This enhanced agility characteristic renders the interceptor missile more complicated and more costly, and usually requires the additional reactive sources of energy for the homing stage (like additional solid motor, DACS, micro-rockets etc).

Reverting to the interceptor in accordance with certain embodiments of the invention, considering that it is a seeker-less missile, there is no "switch" in target location determination (from ground station to seeker as discussed above), no "hand-over" errors, no "homing stage", and accordingly there is no need to provide drastic maneuvering, thereby simplifying the structure of the interceptor missile and the steering system that guides it toward the PIP.

Note that the system architecture in FIGS. 2C, 3B, 4, is provided for illustrative purposes only and is by no means binding. Accordingly, the system architecture of each of the specified drawings may be modified by consolidating two or more blocks/modules/units/systems and/or by modifying at least one of them and or by deleting at least one of them and replacing one or more others, all as required and appropriate, depending upon the particular implementation.

Note that the flow chart illustrating sequence of operation in FIG. 11 is provided for illustrative purposes only and is by no means binding. Accordingly, the operational stages may be modified by consolidating two or more stages and/or by modifying at least one of them and or by deleting at least one of them and replacing one or more others, all as required and appropriate, depending upon the particular implementation.

Unless specifically stated otherwise, as apparent from the following discussions, it is appreciated that throughout the specification discussions utilizing terms such as "achieving", "generating", "updating", "utilizing" and "activating" or the like, include actions and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and/or any combination thereof.

The operations in accordance with the teachings herein may be performed by a computer specially constructed for the desired purposes or by a general purpose computer specially configured for the desired purpose by a computer program stored in a computer readable storage medium.

The various elements of the embodiment described above may be combined with different embodiments and/or aspects of the invention described above.

The present invention has been described with a certain degree of particularity, but those versed in the art will readily appreciate that various alterations and modifications may be carried out, without departing from the scope of the following claims:

The invention claimed is:

1. A seeker-less interceptor missile comprising a motor, an uplink communication system, a navigation system comprising an airborne computer configured to repeatedly determine navigation data, a steering system and a warhead;
   the seeker-less interceptor missile is configured to receive mission data through an uplink receiver unit, the mission data including:
      a. Predicted Interception Point (PIP) as determined by at least three accurately time synchronized external sensors;
      b. time of launch;
      c. seeker-less interceptor missile separation time; and
      d. seeker-less interceptor missile location data, and
   the seeker-less interceptor missile is further configured to repeatedly receive updated portions of said mission data including updated PIP, updated seeker-less interceptor missile separation time and updated seeker-less interceptor missile location data;
   said airborne computer is configured to generate, based on at least a portion of the mission data and the updated portions of said mission data, the navigation data and steering commands for the steering system for guiding said seeker-less interceptor missile towards an updated PIP; and
   the airborne computer configured to activate said warhead for damaging a flying object on or in the vicinity of said PIP, in response to meeting a lethality criteria.

2. The seeker-less interceptor missile according to claim 1, wherein accuracy of the three accurately time synchronized external sensors is on the order of 1 nanosecond.

3. The seeker-less interceptor missile according to claim 1, wherein said PIP is initially determined based on an external active sensor of said sensors and at least some of said repeatedly determined updated PIP are determined based on the at least three accurately time synchronized external sensors.

4. The seeker-less interceptor missile according to claim 2, wherein said PIP is initially determined based on an external active sensor of said sensors and at least some of said repeatedly determined updated PIP are determined based on the at least three accurately time synchronized external sensors.

5. The seeker-less interceptor missile according to claim 1, wherein said navigation system includes a body angles measurement unit including three angle rate measurement units for repeatedly determining navigation data including the interceptor missile body angular position in three mutually perpendicular axes.

6. The seeker-less interceptor missile according to claim 2, wherein said navigation system includes a body angles measurement unit including three angle rate measurement units for repeatedly determining navigation data including the interceptor missile body angular position in three mutually perpendicular axes.

* * * * *